(12) United States Patent
Yao et al.

(10) Patent No.: US 12,360,344 B2
(45) Date of Patent: Jul. 15, 2025

(54) OPTICAL LENS AND ELECTRONIC DEVICE

(71) Applicant: NINGBO SUNNY AUTOMOTIVE OPTECH CO., LTD, Ningbo (CN)

(72) Inventors: Bo Yao, Ningbo (CN); Dongfang Wang, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 706 days.

(21) Appl. No.: 17/643,625

(22) Filed: Dec. 10, 2021

(65) Prior Publication Data
US 2022/0099927 A1    Mar. 31, 2022

Related U.S. Application Data

(63) Continuation of application No. PCT/CN2020/116228, filed on Sep. 18, 2020.

(30) Foreign Application Priority Data

Dec. 2, 2019    (CN) .......................... 201911211775.2
Dec. 2, 2019    (CN) .......................... 201911212112.2

(51) Int. Cl.
*G02B 9/64*     (2006.01)
*G02B 13/00*    (2006.01)

(52) U.S. Cl.
CPC ........... *G02B 9/64* (2013.01); *G02B 13/0045* (2013.01)

(58) Field of Classification Search
CPC .... G02B 13/0045; G02B 13/006; G02B 9/64; G02B 7/028; G02B 30/00
(Continued)

(56) References Cited

U.S. PATENT DOCUMENTS 5,546,232 A * 8/1996 Hirakawa .......... G02B 15/1425
                                                     359/691
7,586,694 B2    9/2009 Chen et al.
(Continued)

FOREIGN PATENT DOCUMENTS

CN      102262291 A    11/2011
CN      106154488 A    11/2016
(Continued)

OTHER PUBLICATIONS

International Search Report issued in International Application No. PCT/CN2020/116228; mailed Dec. 16, 2020; 5 pgs.

*Primary Examiner* — Wyatt A Stoffa
*Assistant Examiner* — Samanvitha Sridhar
(74) *Attorney, Agent, or Firm* — HAUPTMAN HAM, LLP

(57) ABSTRACT

An optical lens assembly is provided. The optical lens assembly includes: a first lens, a second lens, a third lens, a fourth lens, a fifth lens, a sixth lens and a seventh lens, which are arranged sequentially from an object side to an image side along an optical axis. The first lens has a negative refractive power, and an object-side surface of the first lens is a convex surface, and an image-side surface of the first lens is a concave surface. The second lens has a positive refractive power, an object-side surface of the second lens is a concave surface, and an image-side surface of the second lens is a convex surface. The third lens has a refractive power. The fourth lens has a refractive power. The fifth lens has a refractive power, the sixth lens has a refractive power, and the seventh lens has a positive refractive power.

20 Claims, 5 Drawing Sheets

(58) Field of Classification Search
USPC .................................................. 359/762, 755
See application file for complete search history.

(56) References Cited

U.S. PATENT DOCUMENTS

| | | | |
|---|---|---|---|
| 11,971,608 B2* | 4/2024 | Wang | G02B 13/06 |
| 2011/0317285 A1* | 12/2011 | Ohashi | G02B 27/0025 |
| | | | 359/753 |
| 2013/0100545 A1 | 4/2013 | Jo | |
| 2014/0184882 A1* | 7/2014 | Kuzuhara | G02B 7/14 |
| | | | 359/739 |
| 2018/0059362 A1* | 3/2018 | Yeh | G02B 1/041 |
| 2019/0235210 A1* | 8/2019 | Nakai | G02B 13/006 |
| 2020/0257079 A1* | 8/2020 | Wei | G02B 13/006 |
| 2023/0185061 A1* | 6/2023 | Wang | G02B 9/62 |
| | | | 359/713 |

FOREIGN PATENT DOCUMENTS

| | | | | |
|---|---|---|---|---|
| CN | 107065141 A | * | 8/2017 | ......... G02B 13/0015 |
| CN | 206515544 U | | 9/2017 | |
| CN | 108388004 A | | 8/2018 | |
| CN | 108490589 A | | 9/2018 | |
| CN | 108873273 A | | 11/2018 | |
| CN | 109307921 A | | 2/2019 | |
| CN | 109324384 A | | 2/2019 | |
| CN | 109324385 A | | 2/2019 | |
| CN | 109425958 A | | 3/2019 | |
| CN | 110320637 A | | 10/2019 | |
| CN | 110488470 A | | 11/2019 | |

* cited by examiner

OPTICAL LENS AND ELECTRONIC DEVICE

CROSS-REFERENCE TO RELATED APPLICATIONS

The present application is a continuation of International Application No. PCT/CN2020/116228, filed on Sep. 18, 2020, which claims priorities to Chinese Patent Application No. 201911211775.2, filed before the China National Intellectual Property Administration on Dec. 2, 2019, and Chinese Patent Application No. 201911212112.2, filed before the China National Intellectual Property Administration on Dec. 2, 2019. All of the aforementioned patent applications are hereby incorporated by reference in their entireties.

TECHNICAL FIELD

The present disclosure relates to the field of an optical element, and more specifically, relates to an optical lens and an electronic device.

BACKGROUND

With the rapid development of vehicle driving assistance systems in recent years, optical lens assemblies are more and more widely used in vehicles. For the sake of safe driving, the market has higher and higher performance requirements for the optical lens assemblies used in the vehicle driving assistance systems.

However, with the continuous breakthroughs in autonomous driving technology, optical lens assemblies are playing a more and more important role in autonomous driving systems. The market also has a stricter requirement on their performances. In addition to the need for high-pixel imaging quality, the market requires the optical lens assemblies to be continuously miniaturized to facilitate lens installation and use. At the same time, the market also requires the optical lens assemblies to have high performance stability in the environment of large temperature difference, so that the autonomous driving systems can be applied to the application environment of large temperature difference.

As important imaging optical elements, the optical lens assemblies have important applications in many fields. For example, with the rapid development of vehicle driving assistance systems in recent years, optical lens assemblies are more and more widely used in vehicles. The image information collected by the optical lens assemblies can be used as important decision data of the vehicle driving assistance systems (or even the autonomous driving systems). For the sake of safe driving, the market has higher and higher performance requirements for the optical lens assemblies used in the vehicle driving assistance systems or the autonomous driving systems. In this context, the imaging quality, miniaturization and temperature stability of the optical lens assemblies are becoming more and more important.

SUMMARY

In a first aspect, the present disclosure provides an optical lens assembly, which may include, sequentially from an object side to an image side along an optical axis, a first lens, a second lens, a third lens, a fourth lens, a fifth lens, a sixth lens and a seventh lens. The first lens may have a negative refractive power, an object-side surface thereof is a convex surface, and an image-side surface thereof is a concave surface. The second lens may have a refractive power, an object-side surface thereof is a concave surface, and an image-side surface thereof is a convex surface. The third lens has a refractive power. The fourth lens has a refractive power. The fifth lens has a refractive power. The sixth lens has a refractive power, where the refractive power of the sixth lens is opposite to the refractive power of the fifth lens. The seventh lens has a positive refractive power.

In another aspect, the present disclosure provides an imaging device, including the optical lens assembly of the first aspect and an imaging element for converting an optical image formed by the optical lens assembly into an electrical signal.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings.

DETAILED DESCRIPTION OF EMBODIMENTS

Figure 1:
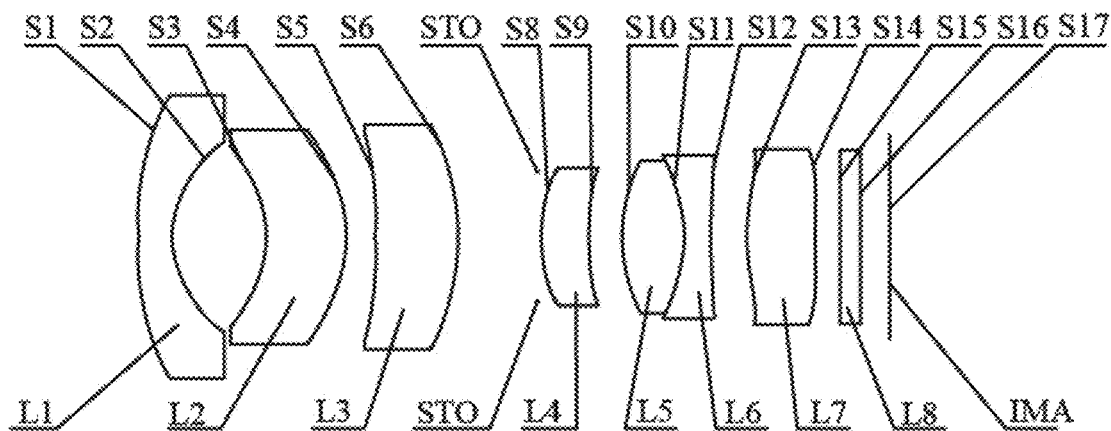
FIG. 1 is a schematic structural diagram showing an optical lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, without departing from the teachings of the present disclosure, a first lens discussed below may also be referred to as a second lens or a third lens.

In the accompanying drawings, the thickness, size and shape of the lens have been somewhat exaggerated for the convenience of explanation. In particular, shapes of spherical surfaces or aspherical surfaces shown in the accompanying drawings are shown by way of example. That is, shapes of the spherical surfaces or the aspherical surfaces are not limited to the shapes of the spherical surfaces or the aspherical surfaces shown in the accompanying drawings. The accompanying drawings are merely illustrative and not strictly drawn to scale.

Herein, the paraxial area refers to an area near the optical axis. If a surface of a lens is a convex surface and the position of the convex surface is not defined, it indicates that the surface of the lens is convex at least in the paraxial region. If a surface of a lens is a concave surface and the position of the concave surface is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples is combined with each other on a non-conflict basis. The present disclosure will be described in detail below with reference to the accompanying drawings and in combination with the examples.

The features, principles, and other aspects of the present disclosure are described in detail below.

In some embodiments, an optical lens assembly includes, for example, seven lenses having a refractive power, i.e., a first lens, a second lens, a third lens, a fourth lens, a fifth lens, a sixth lens and a seventh lens. The seven lenses are sequentially arranged from an object side to an image side along an optical axis.

In some embodiments, an optical lens assembly may further include a photosensitive element disposed on an imaging plane. Alternatively, the photosensitive element disposed on the imaging plane may be a Charge-Coupled Device element (CCD) or a Complementary Metal-Oxide Semiconductor element (CMOS).

The first lens may have a negative refractive power and a meniscus shape, an object-side surface thereof may be a convex surface, and an image-side surface thereof may be a concave surface. The refractive power and shape configuration of the first lens is conducive to collecting incident light from a large field of view, allowing more light to smoothly enter the rear optical system, increasing the amount of light, and improving the imaging quality. In practical applications, the on-board lenses are generally exposed in an outdoor environment, the meniscus lens protruding toward the object side facilitates rain or snow to slide down the lenses, thereby extending the life of the lens assembly, and reducing the impact of rain or snow on the imaging quality of the lens assembly.

The second lens may have a positive refractive power, an object-side surface thereof may be a concave surface, and an image-side surface thereof may be a convex surface. The refractive power and shape configuration of the second lens is not only conducive to allowing light to smoothly enter the rear optical system, thereby improving the resolution quality of the optical system, but also conducive to collecting more light from a large field of view, allowing the light to enter the rear optical system, thereby increasing the amount of light.

The third lens may have a positive refractive power or a negative refractive power, an object-side surface thereof may be a concave surface and an image-side surface thereof may be a convex surface, or both the object-side surface and the image-side surface thereof may be concave surfaces. The positive refractive power of the third lens is not only conducive to the convergence of the light, reducing the aperture and length of the optical lens barrel, but also conducive to the miniaturization of the lens assembly.

The fourth lens may have a positive refractive power, an object-side surface thereof may be a convex surface and an image-side surface thereof may be a concave surface, or both an object-side surface and an image-side surface thereof may be convex surfaces. The positive refractive power of the fourth lens is not only conducive to correcting the aberration generated by a group of front lenses, converging the light beam, increasing the aperture of the lens assembly, and but also conducive to making the optical system more compact in structure and shortening the total length of the lens, so that the optical system has a relatively short total length.

The fifth lens may have a positive or negative refractive power, both an object-side surface and an image-side surface thereof may be convex surfaces, or both the object-side surface and the image-side surface thereof may be concave surfaces.

The sixth lens may have a positive or negative refractive power, both an object-side surface and an image-side surface thereof may be concave surfaces, or the object-side surface thereof may be a concave surface and the image-side surface thereof may be a convex surface, or both the object-side surface and the image-side surface thereof may be convex surfaces.

The seventh lens may have a positive refractive power, an object-side surface thereof may be a convex surface, and an image-side surface thereof may be a concave surface. The refractive power and shape configuration of the seventh lens is conducive to converging the front lights, reducing the CRA, and improving the resolution quality of the system.

In some embodiments, a stop for limiting the light beam may be disposed between the third lens and the fourth lens to further improve the imaging quality of the optical lens assembly. The stop helps to efficiently converge the lights entering the optical system, shortens the total length of the system, and reduces the aperture of the lens. In an embodiment of the present disclosure, a stop may be disposed near the object-side surface of the second lens. However, it should be noted that the position of the stop disclosed herein is only exemplary and not restrictive. In an alternative embodiment, the stop may alternatively be disposed at other position as required.

In some embodiments, the optical lens assembly according to the present disclosure may further include a filter disposed between the seventh lens and the imaging plane to filter lights having different wavelengths, as needed. In addition, the optical lens assembly may alternatively include a protective glass disposed between the seventh lens and the imaging plane to prevent image-side elements (for example, chips) of the optical lens assembly from being damaged.

As is known to those skilled in the art, a cemented lens can be used to minimize or eliminate chromatic aberration. The use of the cemented lens in the optical lens assembly may improve image quality and reduce the reflection loss of light energy, thereby enhancing the imaging sharpness of the lens assembly. In addition, the use of the cemented lens may also simplify the assembly procedures in the lens manufacturing process.

In some embodiments, the fifth lens and the sixth lens may be cemented to form a cemented lens. The fifth lens, of which an object-side surface and an image-side surface are convex, are cemented with the sixth lens, of which an object-side surface and an image-side surface are concave; or the fifth lens, of which an object-side surface and an image-side surface are convex, are cemented with the sixth lens, of which an object-side surface is concave and an image-side surface is convex; or the fifth lens, of which an object-side surface and an image-side surface are concave, are cemented with the sixth lens, of which an object-side surface and an image-side surface are convex. The fifth lens and the sixth lens may be cemented to form the cemented lens, which is conducive to smoothly transitioning the light emitted from the fourth lens to the imaging plane, reducing the total length of the optical system, and correcting various aberrations of the optical system, achieves that under the premise of making the optical system compact in structure, the optical performances are improved, for example, a resolution of the system is improved, and the distortion and CRA are optimized. The cemented lenses have at least one of the following advantages: reducing chromatic aberration of the cemented lenses, reducing tolerance sensitivity, and compensating the overall chromatic aberration of the system through the partial residual chromatic aberration; reducing the air gap between the two lenses, thereby reducing the total length of the system; reducing the assembly components between the lenses, thereby reducing the process and reducing the cost; reducing the tolerance sensitivity of the lens units due to the tilt/eccentricity generated during the assembly process of the lens units, and improving the production yield; reducing the light loss caused by the reflection between the lenses, increasing the illuminance; and further reducing the curvature of field, effectively correcting the off-axis point aberration of the optical lens. Such a cementing design helps to correct the overall chromatic aberration of the system, effectively corrects the aberration to improve the resolution, and makes the optical system compact as a whole to meet the requirements of miniaturization. In some embodiments, a radius of curvature R8 of the object-side surface of the fourth lens and a radius of curvature R9 of the image-side surface of the fourth lens satisfy $|R8/R9|\leq 1.1$, such as $|R8/R9|\leq 0.8$. The ratio of the radius of curvature of the object-side surface of the fourth lens to the radius of curvature of the image-side surface of the fourth lens is reasonably set, so that the radius of curvature of the object-side surface of the lens is similar to the radius of curvature of the image-side surface of the lens, or the shape of the object-side surface is more curved than the image-side surface, which is conducive to correcting the aberration of the optical system and improving the imaging quality.

In some embodiments, an axial distance TTL from the object-side surface of the first lens to the imaging plane of the optical lens assembly and a total focal length F of the optical lens assembly satisfy $TTL/F\leq 9$, such as $TTL/F\leq 8$. In the present disclosure, the axial distance from the object-side surface of the first lens to the imaging plane of the optical lens assembly is also referred to as the total length of the optical lens assembly. Reasonably setting the ratio of the total length of the optical lens assembly to the total focal length, is beneficial to a good performance of the optical lens assembly, and to achieving miniaturization of the lens assembly.

In some embodiments, an axial distance TTL from the object-side surface of the first lens to the imaging plane of the optical lens assembly, a maximum field-of-view FOV of the optical lens assembly, and an image height H corresponding to the maximum field-of-view of the optical lens assembly satisfy $TTL/H/FOV\leq 0.06$, such as $TTL/H/FOV\leq 0.05$. Reasonably setting the interrelationship among the above three is conducive to realizing the miniaturization of the lens assembly, so that the optical system has a smaller size of the lens assembly, with a given imaging plane and a given image height.

In some embodiments, a maximum field-of-view FOV of the optical lens assembly, a maximum aperture D of the object-side surface of the first lens corresponding to the maximum field-of-view of the optical lens assembly, and an image height H corresponding to the maximum field-of-view FOV satisfy $D/H/FOV\leq 0.025$, such as $D/H/FOV\leq 0.02$. Reasonably setting the interrelationship among the above three is conducive to reducing the aperture of the front end of the optical lens assembly, realizing the miniaturization.

In some embodiments, a focal length F5 of the fifth lens and a focal length F6 of the sixth lens satisfy $0.5\leq|F5/F6|\leq 1.6$, such as $0.6\leq|F5/F6|\leq 1.5$. The ratio of the focal length of the fifth lens to the focal length of the sixth lens is reasonably set, so that the focal length of the fifth lens is close to the focal length of the sixth lens, which is conducive to smoothly transitioning the light and correcting the chromatic aberration of the system.

In some embodiments, a maximum value p of ratios between axial center thicknesses of any two lenses among the first lens to seventh lens satisfy $1\leq p\leq 6$, such as $2\leq p\leq 5$. The ratios between center thicknesses of any two lenses along the optical axis among the first lens to seventh lens are all within 1 to 6 (including 1 and 6), so that the thicknesses of the lenses in the optical lens assembly are similar, which is conducive to a stable function of each lens. In an environment in which the temperature changes between low and high, the lights in the optical system have a small change, so that the optical system has good temperature adaptability.

In some embodiments, a radius of curvature R3 of the object-side surface of the second lens and a radius of curvature R4 of the image-side surface of the second lens satisfy $0.5\leq|R3/R4|\leq 1.5$, such as $0.6\leq|R3/R4|\leq 1.1$. The ratio of the radius of curvature of the object-side surface of the second lens to the radius of curvature of the image-side surface of the second lens is reasonably set, so that the radius of curvature of the object-side surface of the lens is similar to the radius of curvature of the image-side surface of the lens, which is conducive to the light smoothly entering the optical system, and improving the resolution quality of the system.

In some embodiments, a combined focal length F56 of the fifth lens and the sixth lens and a total focal length F of the optical lens assembly satisfy $7 \leq |F56/F|$, such as $8 \leq |F56/F|$. The ratio of the combined focal length of the fifth lens and the sixth lens to the total focal length of the optical lens assembly is reasonably set, which is conducive to realizing the thermal compensation of the system.

In some embodiments, a maximum field-of-view FOV of the optical lens assembly, an image height H corresponding to the maximum field-of-view FOV of the optical lens assembly, and a total focal length F of the optical lens assembly satisfy $(FOV \times F)/H \geq 50$, such as $(FOV \times F)/H \geq 55$. Reasonably setting the interrelationship among the above three is conducive to achieving a lens assembly with a large field-of-view and telephoto characteristic, thereby realizing large angular resolution.

In some embodiments, a radius of curvature R3 of the object-side surface of the second lens and a radius of curvature R4 of the image-side surface of the second lens satisfy $0.02 \leq (R3-R4)/(R3+R4) \leq 0.4$, such as $0.03 \leq (R3-R4)/(R3+R4) \leq 0.3$. The radius of curvature of the object-side surface of the second lens and the radius of curvature of the image-side surface of the second lens are set to satisfy the above relationship, which is conducive to correcting the aberration of the optical system, so that when the light emitted from the second lens enters the object-side surface of the third lens, the incident angle of the light is not too large, thereby reducing the tolerance sensitivity of the optical system. If the value determined by the conditional expression exceeds the upper limit, the aberration of the optical system may not be sufficiently corrected; or if the value determined by the conditional expression is lower than the lower limit, the incident angle of the light may be too large when the light emitted from the first lens enters the object-side surface of the second lens, which increases the sensitivity of the optical system.

In some embodiments, a total focal length F of the optical lens assembly and a radius of curvature R1 of the object-side surface of the first lens satisfy $|F/R1| \leq 0.6$, such as $|F/R1| \leq 0.5$. The ratio of the total focal length of the optical lens assembly to the radius of curvature of the object-side surface of the first lens is reasonably set, which is not only conducive to avoiding a small radius of curvature of the object-side surface of the first lens, and avoiding the aberration caused by the small radius of curvature of the object-side surface when the light is incident, but also conducive to the manufacturing of the first lens.

In some embodiments, a focal length F1 of the first lens and a total focal length F of the optical lens assembly satisfy $|F1/F| \leq 7$, such as $|F1/F| \leq 5$. The ratio of the focal length of the first lens to the total focal length of the optical lens assembly is reasonably set, which is conducive to more light smoothly entering the optical system, and improving the illuminance of the optical system.

In some embodiments, a focal length F2 of the second lens and a total focal length F of the optical lens assembly satisfy $|F2/F| \leq 70$, such as $|F2/F| \leq 60$. The ratio of the focal length of the second lens to the total focal length of the optical lens assembly is reasonably set, which is conducive to compensating various aberration of the optical system.

In some embodiments, a focal length F3 of the third lens and a total focal length F of the optical lens assembly satisfy $|F3/F| \leq 65$, such as $|F3/F| \leq 55$. The ratio of the focal length of the third lens to the total focal length of the optical lens assembly is reasonably set, which is conducive to compensating various aberrations of the optical system.

In some embodiments, a focal length F4 of the fourth lens and a total focal length F of the optical lens assembly satisfy $|F4/F| \leq 10$, such as $|F4/F| \leq 8$. The ratio of the focal length of the fourth lens to the total focal length of the optical lens assembly is reasonably set, which is conducive to compensating various aberrations of the optical system.

In some embodiments, a focal length F5 of the fifth lens and a total focal length F of the optical lens assembly satisfy $|F5/F| \leq 7$, such as $|F5/F| \leq 5$. The ratio of the focal length of the fifth lens to the total focal length of the optical lens assembly is reasonably set, which is conducive to compensating various aberrations of the optical system.

In some embodiments, a focal length F6 of the sixth lens and a total focal length F of the optical lens assembly satisfy $|F6/F| \leq 7$, such as $|F6/F| \leq 5$. The ratio of the focal length of the sixth lens to the total focal length of the optical lens assembly is reasonably set, which is conducive to compensating various aberrations of the optical system.

In some embodiments, a focal length F7 of the seventh lens and a total focal length F of the optical lens assembly satisfy $1 \leq |F7/F|$, such as $2 \leq |F7/F|$. The ratio of the focal length of the seventh lens to the total focal length of the optical lens assembly is reasonably set, which is conducive to compensating various aberrations of the optical system.

In some embodiments, the second lens, the fourth lens and the seventh lens are aspheric lenses. The features of aspheric lenses are: the curvature continuously changes from the center of the lens to the edge of the lens. Unlike spherical lenses, which have a constant curvature from the center of the lens to the periphery of the lens, aspheric lenses have better characteristics about radius of curvature and have the advantages of improving distortion and astigmatic aberration. With the aspheric lens, aberration occurring during imaging can be eliminated as much as possible, thereby improving the imaging quality of the lens assembly. The configuration of the aspheric lens is conducive to correcting the aberration of the system and improving the resolution. In this embodiment, the second lens, the fourth lens and the seventh lens are aspheric lenses, which is conducive to improving the resolution quality of the optical system.

By reasonable configurations of the shape of the lenses and the refractive powers of the lenses, the optical lens assembly according to the embodiments of the present disclosure may realize, by only adopting seven lenses, high resolution quality of the optical system while meeting the requirements such as a small size of the lens assembly, low sensitivity, high production yield and low cost. The optical lens assembly may further have a feature of small CRA, which not only helps to avoid stray light from hitting the lens barrel when the light is emitted from the rear end of the system, but also can match an on-board chip well to avoid color cast and vignetting. At the same time, the optical lens assembly has the advantages of good temperature adaptability, small changes of imaging effects in an environment in which the temperature changes between low and high, stable imaging quality, and facilitating accurate ranging of a binocular lens.

By configuring a cemented lens, the optical lens assembly according to the embodiments of the present disclosure may help to correct the overall chromatic aberration of the system, which is conducive to correcting the aberration of the system to improve the resolution quality of the system, and making the structure of optical system compact as a whole to meet the requirements of miniaturization.

In some embodiments, the first to seventh lenses of the optical lens assembly may all be made of glass material. An optical lens made of glass material may suppress the deviation of the back focal length of the optical lens assembly caused by temperature change, so as to improve the stability of the system. At the same time, adopting glass material may avoid the imaging blur of the lens assembly caused by a change between high temperature and low temperature in the use environment and avoid affecting the normal use of the lens assembly. In application scenarios with low requirements of temperature stability, the first to seventh lenses may alternatively be made of plastic material. An optical lens made of plastic material can effectively reduce manufacturing cost.

In some embodiments, an optical lens assembly includes, for example, seven lenses having refractive powers, i.e., a first lens, a second lens, a third lens, a fourth lens, a fifth lens, a sixth lens and a seventh lens. The seven lenses are sequentially arranged from an object side to an image side along an optical axis.

In some embodiments, an optical lens assembly may further include a photosensitive element disposed on an imaging plane. Alternatively, the photosensitive element disposed on the imaging plane may be a Charge-Coupled Device element (CCD) or a Complementary Metal-Oxide Semiconductor element (CMOS).

The first lens may have a negative refractive power and a meniscus shape, an object-side surface thereof may be a convex surface, and an image-side surface thereof may be a concave surface. The refractive power and shape configuration of the first lens is conducive to collecting incident light from a large field of view, allowing more lights to smoothly enter the rear optical system, increasing the amount of lights, and improving the imaging quality of the optical system. In practical applications, the on-board lenses are generally exposed in an outdoor environment, the meniscus lens protruding toward the object side facilitates rain or snow to slide down the lenses, thereby extending the life of the lens assembly, and reducing the impact of rain or snow on the imaging quality of the lens assembly.

The second lens may have a negative refractive power, an object-side surface thereof may be a concave surface, and an image-side surface thereof may be a convex surface. The refractive power and shape configuration of the second lens is not only conducive to allowing light to smoothly enter the rear optical system, thereby improving the resolution quality of the optical system, but also conducive to collecting more light from a large field of view, allowing the light to enter the rear optical system, thereby increasing the amount of light.

The third lens may have a positive refractive power, and both an object-side surface and an image-side surface thereof may be convex surfaces, or both the object-side surface and the image-side surface thereof may be concave surfaces. Configuring the refractive power of the third lens as positive is not only conducive to smoothing the trend of the lights, reducing the aperture and length of the optical lens barrel, but also conducive to the miniaturization of the lens assembly.

The fourth lens may have a positive or negative refractive power, an object-side surface thereof may be a concave surface and an image-side surface thereof may be a convex surface, or the object-side surface thereof may be a convex surface and the image-side surface thereof may be a concave surface, or both the object-side surface and the image-side surface thereof may be concave surfaces. Configuring the fourth lens in the optical system is not only conducive to correcting the aberration generated by the front lens group, converging the light beam, increasing the aperture of the lens assembly, and but also conducive to making the optical system more compact in structure and shortening the total length of the lens, so that the optical system has a relatively short total length.

The fifth lens may have a positive refractive power, and both an object-side surface and an image-side surface thereof may be convex surfaces.

The sixth lens may have a negative refractive power, an object-side surface thereof may be a concave surface and an image-side surface thereof may be a convex surface.

The seventh lens may have a positive refractive power, an object-side surface thereof may be a convex surface and an image-side surface thereof may be a concave surface, or the object-side surface thereof may be a concave surface and the image-side surface thereof may be a convex surface, or both the object-side surface and the image-side surface thereof may be convex surfaces. The refractive power and shape configuration of the seventh lens is conducive to smoothing the trend of the front light, reducing the CRA, and improving the resolution quality of the system.

In some embodiments, a stop for limiting the light beam may be provided between the second lens and the third lens to further improve the imaging quality of the optical lens assembly. The stop helps to efficiently converge the light entering the optical system, shortens the total length of the system, and reduces the aperture of the lens. In an embodiment of the present disclosure, a stop may be disposed near the image-side surface of the second lens or near the object-side surface of the third lens. However, it should be noted that the position of the stop disclosed herein is only exemplary and not restrictive. In an alternative embodiment, the stop may alternatively be disposed at other position as required.

In some embodiments, the optical lens assembly according to the present disclosure may further include a filter disposed between the seventh lens and the imaging plane to filter lights having different wavelengths, as needed. In addition, the optical lens assembly may alternatively include a protective glass disposed between the seventh lens and the imaging plane to prevent image-side elements (for example, chips) of the optical lens assembly from being damaged.

As is known to those skilled in the art, a cemented lens can be used to minimize or eliminate chromatic aberration. The use of the cemented lens in the optical lens assembly may improve image quality and reduce the reflection loss of light energy, thereby enhancing the imaging sharpness of the lens assembly. In addition, the use of the cemented lens may also simplify the assembly procedures in the lens manufacturing process.

In some embodiments, the fifth lens and the sixth lens are cemented to form a cemented lens. The fifth lens having a convex object-side surface and a convex image-side surface is cemented with the sixth lens having a concave object-side surface being and a convex image-side surface, which is conducive to smoothly transitioning the light emitted from the fourth lens to the imaging plane, reducing the total length of the optical system, correcting various aberrations of the optical system, thereby under the premise of making the optical system compact in structure, improving the optical performance such as improving resolution of the system, and optimizing the distortion and CRA. The cementing approach of the lenses has at least one of the following advantages: reducing chromatic aberration, reducing tolerance sensitivity, and compensating the overall chromatic aberration of the system through the partial residual chromatic aberration; reducing the air gap between the two lenses, thereby reducing the total length of the system; reducing the assembly components between the lenses, thereby reducing the process and reducing the cost; reducing the tolerance sensitivity of the lens units due to the tilt/eccentricity generated during the assembly process of the lens units, and improving the production yield; reducing the light loss caused by the reflection between the lenses, increasing the illuminance; and further reducing the curvature of field, effectively correcting the off-axis point aberration of the optical lens. Such a cementing design helps to correct the overall chromatic aberration of the system, effectively corrects the aberration to improve the resolution, and makes the optical system compact as a whole to meet the requirements of miniaturization.

In some embodiments, a radius of curvature R3 of the object-side surface of the second lens and a radius of curvature R4 of the image-side surface of the second lens satisfy |R3/R4|≤15, such as |R3/R4|≤8. The ratio of the radius of curvature of the object-side surface of the second lens to the radius of curvature of the image-side surface of the second lens is reasonably set, so that the radius of curvature of the object-side surface of the lens is similar to the radius of curvature of the image-side surface of the lens, or the shape of the object-side surface is more curved than the image-side surface, which is conducive to correcting the aberration of the optical system and improving the imaging quality.

In some embodiments, an axial distance TTL from the object-side surface of the first lens to the imaging plane of the optical lens assembly and a total focal length F of the optical lens assembly satisfy TTL/F≤9, such as TTL/F≤8. In the present disclosure, the axial distance from the object-side surface of the first lens to the imaging plane of the optical lens assembly is also referred to as the total length of the optical lens assembly. The ratio of the total length of the optical lens assembly to the total focal length is reasonably set, which is conductive to achieving good performance of the optical lens assembly, and achieving miniaturization of the lens assembly.

In some embodiments, an axial distance TTL from the object-side surface of the first lens to the imaging plane of the optical lens assembly, a maximum field-of-view FOV of the optical lens assembly, and an image height H corresponding to the maximum field-of-view of the optical lens assembly satisfy TTL/H/FOV≤0.06, such as TTL/H/FOV≤0.05. The interrelationship among the above three is reasonably set, which is conducive to realizing the miniaturization of the lens assembly, so that the optical system has a smaller size of the lens assembly, with a given imaging plane and a given image height.

In some embodiments, a maximum field-of-view FOV of the optical lens assembly, an image height H corresponding to the maximum field-of-view of the optical lens assembly, and a maximum aperture D of the object-side surface of the first lens corresponding to the maximum field-of-view of the optical lens assembly satisfy D/H/FOV≤0.025, such as D/H/FOV≤0.02. The interrelationship among the above three is reasonably set, which is conducive to reducing the aperture of the front end of the optical lens assembly, realizing the miniaturization.

In some embodiments, an effective focal length F5 of the fifth lens and an effective focal length F6 of the sixth lens satisfy 0.1≤|F5/F6|≤1.6, such as 0.1≤|F5/F6|≤1.5. The ratio of the effective focal length of the fifth lens to the effective focal length of the sixth lens is reasonably set, so that the focal length of the fifth lens is similar to the focal length of the sixth lens, which is conducive to smoothly transitioning the light and correcting the chromatic aberration of the system.

In some embodiments, a maximum value p in ratios between axial center thicknesses of any two lenses among the first lens to seventh lens satisfy 2≤p≤8, such as 3≤p≤7.2. The ratios between axial center thicknesses of any two lenses among the first lens to seventh lens are 2 to 8 (including 2 and 8), so that the thicknesses of the lenses in the optical lens assembly are similar, which is conducive to a stable function of each lens. In an environment in which the temperature change between low and high, the light, in the optical system has a small change, so that the optical system has good temperature adaptability.

In some embodiments, a radius of curvature R13 of the object-side surface of the seventh lens and a radius of curvature R14 of the image-side surface of the seventh lens satisfy |R13/R14|≤15, such as |R13/R14|≤8. The ratio of the radius of curvature of the object-side surface of the seventh lens to the radius of curvature of the image-side surface of the seventh lens is reasonably set, so that the radius of curvature of the object-side surface of the lens is similar to the radius of curvature of the image-side surface of the lens, which is conducive to the light smoothly entering the optical system, and improving the resolution quality of the system.

In some embodiments, a combined focal length F56 of the fifth lens and the sixth lens and a total focal length F of the optical lens assembly satisfy 3≤|F56/F|≤10, such as 3≤|F56/F|≤9.5. The ratio of the combined focal length of the fifth lens and the sixth lens to the total focal length of the optical lens assembly is reasonably set, which is conducive to realizing the thermal compensation of the system.

In some embodiments, a maximum field-of-view FOV of the optical lens assembly, an image height H corresponding to the maximum field-of-view of the optical lens assembly, and a total focal length F of the optical lens assembly satisfy (FOV×F)/H≥50, such as (FOV×F)/H≥55. The interrelationship among the above three is reasonably set, which is conducive to achieving a lens assembly with a large field-of-view and a telephoto characteristic, thereby realizing a large angular resolution.

In some embodiments, a radius of curvature R3 of the object-side surface of the second lens and a radius of curvature R4 of the image-side surface of the second lens satisfy 0.02≤(R3−R4)/(R3+R4)≤0.4, such as 0.03≤(R3−R4)/(R3+R4)≤0.3. The radius of curvature of the object-side surface of the second lens and the radius of curvature of the image-side surface of the second lens are configured to satisfy the above relationship, which is conducive to correcting the aberration of the optical system, so that when the light emitted from the second lens enters the object-side surface of the third lens, the incident angle of the light is too large, thereby reducing the tolerance sensitivity of the optical system. If the value determined by the conditional expression exceeds the upper limit, the aberration of the optical system may not be sufficiently corrected; or if the value determined by the conditional expression is lower than the lower limit, the incident angle of the light may be too large when the light emitted from the first lens enters the object-side surface of the second lens, which will increase the sensitivity of the optical system.

In some embodiments, a total focal length F of the optical lens assembly and a radius of curvature R1 of the object-side surface of the first lens satisfy |F/R1|≤1.5, such as |F/R1|≤1. The ratio of the total focal length of the optical lens assembly to the radius of curvature of the object-side surface of the first lens is reasonably set, which is not only conducive to avoiding a small radius of curvature of the object-side surface of the first lens, and avoiding the aberration generated when the light is incident due to the small radius of curvature of the object-side surface, but also conducive to the manufacturing of the first lens.

In some embodiments, a radius of curvature R1 of the object-side surface of the first lens and a radius of curvature R2 of the image-side surface of the first lens satisfy R1/R2≤30, such as R1/R2≤20. The ratio of the radius of curvature of the object-side surface of the first lens to the radius of curvature of the image-side surface of the first lens is reasonably set, so that the special shape configuration of the first lens is satisfied, which is conducive to improving the resolution of the optical system.

In some embodiments, a total focal length F of the optical lens assembly and an image height H corresponding to the maximum field-of-view of the optical lens assembly satisfy: F/H≤3, such as F/H≤2. The ratio of the total focal length of the optical lens assembly to the image height corresponding to the maximum field-of-view of the optical lens assembly is reasonably set, to satisfy the conditional expression, which is conducive to achieving a telephoto characteristic of the optical system and improving the resolution of the optical system.

In some embodiments, a focal length F1 of the first lens and a total focal length F of the optical lens assembly satisfy 1≤|F1/F|, such as 1≤|F1/F|≤50. The ratio of the focal length of the first lens to the total focal length of the optical lens assembly is reasonably set, which is conducive to more light smoothly entering the optical system, and improving the illuminance of the optical system.

In some embodiments, a focal length F2 of the second lens and a total focal length F of the optical lens assembly satisfy 1≤|F2/F|, such as 1≤|F2/F|≤95. The ratio of the focal length of the second lens to the total focal length of the optical lens assembly is reasonably set, which is conducive to compensating various aberration of the optical system.

In some embodiments, a focal length F3 of the third lens and a total focal length F of the optical lens assembly satisfy 1≤|F3/F|, such as 1≤|F3/F|≤50. The ratio of the focal length of the third lens to the total focal length of the optical lens assembly is reasonably set, which is conducive to compensating various aberration of the optical system.

In some embodiments, a focal length F4 of the fourth lens and a total focal length F of the optical lens assembly satisfy 1≤|F4/F|, such as 1≤|F4/F|≤50. The ratio of the focal length of the fourth lens to the total focal length of the optical lens assembly is reasonably set, which is conducive to compensating various aberrations of the optical system.

In some embodiments, a focal length F5 of the fifth lens and a total focal length F of the optical lens assembly satisfy 0.05≤|F5/F|, such as 0.05≤|F5/F|≤50. The ratio of the focal length of the fifth lens to the total focal length of the optical lens assembly is reasonably set, which is conducive to compensating various aberrations of the optical system.

In some embodiments, a focal length F6 of the sixth lens and a total focal length F of the optical lens assembly satisfy 1≤|F6/F|, such as 1≤|F6/F|≤50. The ratio of the focal length of the sixth lens to the total focal length of the optical lens assembly is reasonably set, which is conducive to compensating various aberrations of the optical system.

In some embodiments, a focal length F7 of the seventh lens and a total focal length F of the optical lens assembly satisfy 1≤|F7/F|, such as 1≤|F7/F|≤50. The ratio of the focal length of the seventh lens to the total focal length of the optical lens assembly is reasonably set, which is conducive to compensating various aberrations of the optical system.

In some embodiments, the first lens, the fourth lens and the seventh lens are aspheric lenses. Aspheric lenses are characterized by a continuous change in curvature from the center of the lens to the periphery of the lens. Unlike spherical lenses, which have a constant curvature from the center of the lens to the periphery of the lens, aspheric lenses have better characteristics about radius of curvature and have the advantages of improving distortion and astigmatic aberration. With the aspheric lens, aberration occurring during imaging can be eliminated as much as possible, thereby improving the imaging quality of the lens assembly. The configuration of the aspheric lens is conducive to correcting the aberration of the system and improving the resolution. Specifically, at least one of the first lens, the fourth lens or the seventh lens is an aspheric lens, which is conducive to improving the resolution quality of the optical system.

By optimizing the shape of the lenses, and reasonably distributing the refractive power of the lenses, the optical lens assembly according to the embodiments of the present disclosure may realize, by only adopting seven lenses, high resolution quality of the optical system while meeting the requirements such as a small size, low sensitivity, high production yield and low cost of the lens assembly. The optical lens assembly may further have a feature of small CRA, which not only helps to avoid stray light from hitting the lens barrel when the light is emitted from the rear end of the system, but also can match an on-board chip well to avoid color cast and vignetting. At the same time, the optical lens assembly has the advantages of good temperature adaptability, small changes of imaging effects in an environment in which the temperature changes between low and high, stable imaging quality, and facilitating accurate ranging of a binocular lens.

By configuring a cemented lens, the optical lens assembly according to the embodiments of the present disclosure may help to correct the overall chromatic aberration of the system, which is conducive to correcting the aberration of the system to improve the resolution quality of the system, and making the structure of optical system compact as a whole to meet the requirements of miniaturization.

In some embodiments, the first to seventh lenses of the optical lens assembly may all be made of glass material. An optical lens made of glass material may suppress the deviation of the back focal length of the optical lens assembly caused by temperature change, so as to improve the stability of the system. At the same time, adopting glass material may avoid the imaging blur of the lens assembly caused by a change between high temperature and low temperature in the use environment and avoid affecting the normal use of the lens assembly. Specifically, when focusing on resolution quality and reliability, the first to seventh lenses may all be aspheric glass lenses. In application scenarios with low requirements of temperature stability, the first to seventh lenses may alternatively be made of plastic material. An optical lens made of plastic material can effectively reduce manufacturing cost.

However, it will be understood by those skilled in the art that the number of lenses constituting the optical lens assembly may be varied to achieve the various results and advantages described herein without departing from the technical solutions claimed by the present disclosure. For example, although some embodiments are described by taking seven lenses as an example, the optical lens assembly is not limited to include seven lenses. The optical lens assembly may alternatively include other numbers of lenses as needed.

Some specific examples of an optical lens assembly applicable to the above embodiments will be further described below with reference to the accompanying drawings.

Example 1

An optical lens assembly according to Example 1 of the present disclosure is described below with reference to FIG. 1. FIG. 1 shows a schematic structural diagram of the optical lens assembly according to Example 1 of the present disclosure.

As shown in FIG. 1, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a meniscus lens having a positive refractive power, and an object-side surface S5 thereof is a concave surface and an image-side surface S6 thereof is a convex surface. The fourth lens L4 is a meniscus lens having a positive refractive power, and an object-side surface S8 thereof is a convex surface and an image-side surface S9 thereof is a concave surface. The fifth lens L5 is a biconvex lens having a positive refractive power, and an object-side surface S10 thereof is a convex surface and an image-side surface S11 thereof is a convex surface. The sixth lens L6 is a biconcave lens having a negative refractive power, and an object-side surface S11 thereof is a concave surface and an image-side surface S12 thereof is a concave surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the object-side surface S8 of the fourth lens L4.

In this example, all of the object-side surface and the image-side surface of the second lens L2, the object-side surface and the image-side surface of the fourth lens L4, and the object-side surface and the image-side surface of the seventh lens L7 may be aspheric.

Alternatively, the optical lens assembly may further include an optical filter L8 having an object-side surface S15 and an image-side surface S16, and/or a protective glass L8'.

The optical filter L8 may be used to correct color deviations. The protective glass L8' may be used to protect an image sensing chip IMA arranged on an imaging plane S17. Light from an object sequentially passes through the respective surfaces S1 to S16 and is finally imaged on the imaging plane S17.

Table 1 shows radius of curvature R, thickness T (it should be appreciated that the thickness T in the row where S1 is located is the center thickness of the first lens L1, the thickness T in the row where S2 is located is the air gap d12 between the first lens L1 and the second lens L2, and so on), refractive index Nd and abbe number Vd of each lens of the optical lens assembly in Example 1.

TABLE 1

| Surface No. | Radius of Curvature R (mm) | Thickness T (mm) | Refractive Index Nd | Abbe Number Vd |
|---|---|---|---|---|
| S1 | 31.5337 | 2.0000 | 1.77 | 49.61 |
| S2 | 6.0469 | 5.5963 | | |
| S3 | −6.7519 | 5.0000 | 1.59 | 61.16 |
| S4 | −8.1062 | 1.6448 | | |
| S5 | −89.0000 | 5.0000 | 1.62 | 63.41 |
| S6 | −14.7388 | 4.8066 | | |
| STO | Infinite | 0.1000 | | |
| S8 | 11.4849 | 3.1289 | 1.59 | 61.16 |
| S9 | 24.8345 | 1.8698 | | |
| S10 | 9.9738 | 3.7540 | 1.50 | 81.59 |
| S11 | −7.8561 | 1.6000 | 1.78 | 25.72 |
| S12 | 44.3009 | 1.9766 | | |
| S13 | 12.3153 | 5.1941 | 1.59 | 61.16 |
| S14 | 58.2051 | 0.9481 | | |
| S15 | Infinite | 1.0460 | 1.52 | 64.21 |
| S16 | Infinite | 1.6090 | | |
| IMA | Infinite | | | |

The example employs seven lenses as an example. By reasonably configuring the refractive power and surface shape of each lens, the center thickness of each lens, and the air gap between the lenses, at least one of the beneficial effects of high resolution, miniaturization, small aperture of the front end, small CRA, and good temperature performance may be achieved. Each surface shape Z of each aspheric surface is defined by the following formula:

$$Z(h) = \frac{ch^2}{1 + \sqrt{1 - (k+1)c^2h^2}} + Ah^4 + Bh^6 + Ch^8 + Dh^{10} + Eh^{12} \quad (1)$$

where, Z is the sag-the axis-component of the displacement of the surface from the aspheric vertex, when the surface is at height h from the optical axis; c is a paraxial curvature of the aspheric surface, c=1/R (that is, the paraxial curvature c is a reciprocal of the radius of curvature R in the above Table 1); k is a conic coefficient; A, B, C, D, E and F are high-order coefficients. Table 2 below shows the conic coefficient k and the high-order coefficients A, B, C, D, E and F applicable to aspheric surfaces S3, S4, S8, S9, S13 and S14 in Example 1.

TABLE 2

| Surface No. | k | A | B | C | D | E | F |
|---|---|---|---|---|---|---|---|
| S3 | 4.06E−02 | 3.78E−04 | 6.32E−06 | 2.25E−07 | −5.02E−09 | 1.00E−10 | 3.31E−13 |
| S4 | 4.55E−02 | 3.83E−04 | 1.87E−06 | 4.31E−09 | 1.49E−09 | −3.24E−11 | 2.73E−13 |
| S8 | −8.22E−01 | 6.11E−04 | 4.72E−06 | −7.57E−10 | 6.19E−09 | 1.08E−12 | 2.67E−13 |

TABLE 2-continued

| Surface No. | k | A | B | C | D | E | F |
|---|---|---|---|---|---|---|---|
| S9 | −1.26E+01 | 5.59E−04 | 1.15E−05 | −2.61E−07 | 2.05E−08 | 3.60E−10 | −2.62E−12 |
| S13 | 1.15E+00 | −7.17E−04 | −1.06E−05 | 2.75E−07 | −2.76E−08 | 6.16E−10 | 1.33E−12 |
| S14 | 9.85E+01 | −7.28E−04 | −1.12E−05 | −1.69E−07 | 1.50E−08 | −1.95E−10 | 5.37E−14 |

Example 2

Figure 2:
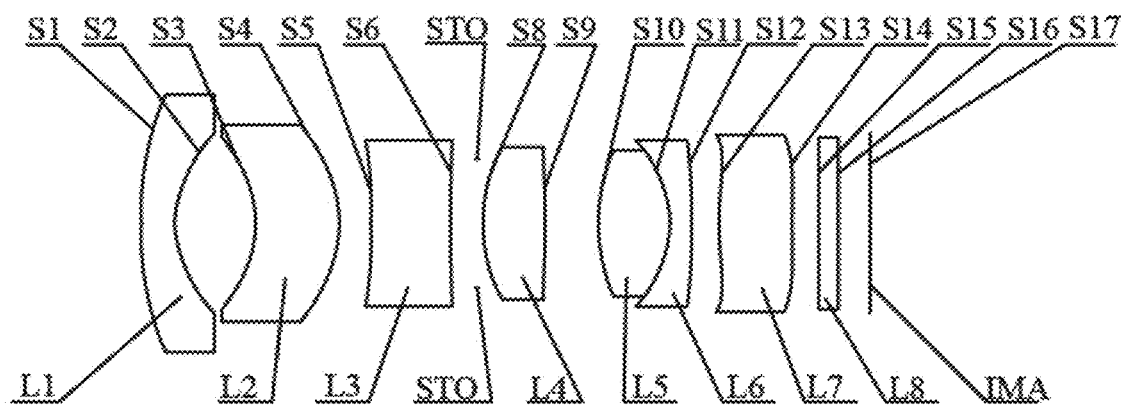
FIG. 2 is a schematic structural diagram showing an optical lens assembly according to Example 2 of the present disclosure.

An optical lens assembly according to Example 2 of the present disclosure is described below with reference to FIG. 2. In this example and the following examples, for brevity, the description of parts similar to those in Example 1 will be omitted. FIG. 2 shows a schematic structural diagram of the optical lens assembly according to Example 2 of the present disclosure.

As shown in FIG. 2, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a biconcave lens having a negative refractive power, and an object-side surface S5 thereof is a concave surface and an image-side surface S6 thereof is a concave surface. The fourth lens L4 is a biconvex lens having a positive refractive power, and an object-side surface S8 thereof is a convex surface and an image-side surface S9 thereof is a convex surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO, and the stop STO may be disposed between the third lens L3 and the fourth lens L4 to improve imaging quality.

In this example, all of the object-side surface and the image-side surface of the second lens L2, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 3 shows radius of curvature R, thickness T, refractive index Nd and Abbe number Vd of each lens of the optical lens assembly in Example 2.

TABLE 3

| Surface No. | Radius of Curvature R (mm) | Thickness T (mm) | Refractive Index Nd | Abbe Number Vd |
|---|---|---|---|---|
| S1 | 26.7649 | 2.0000 | 1.77 | 49.61 |
| S2 | 5.8896 | 5.0977 | | |
| S3 | −6.5010 | 5.0000 | 1.59 | 61.16 |
| S4 | −7.1287 | 1.6203 | | |
| S5 | −150.0000 | 5.0000 | 1.62 | 63.41 |
| S6 | 150.0000 | 1.5077 | | |
| STO | Infinite | 0.1000 | | |
| S8 | 10.6742 | 3.9109 | 1.59 | 61.16 |
| S9 | −51.0515 | 3.1072 | | |
| S10 | 10.8008 | 4.2879 | 1.50 | 81.59 |
| S11 | −6.1969 | 1.3000 | 1.78 | 25.72 |
| S12 | −76.7013 | 1.5632 | | |
| S13 | 19.3792 | 4.6747 | 1.59 | 61.16 |
| S14 | 57.4634 | 1.5000 | | |
| S15 | Infinite | 1.0460 | 1.52 | 64.21 |
| S16 | Infinite | 1.8839 | | |
| IMA | Infinite | | | |

Table 4 below shows the conic coefficients k and the high-order coefficients A, B, C, D, E and F applicable to aspheric surfaces S3, S4, S8, S9, S13 and S14 in Example 2.

TABLE 4

| Surface No. | k | A | B | C | D | E | F |
|---|---|---|---|---|---|---|---|
| S3 | 6.00E−02 | 5.02E−04 | 4.71E−06 | 2.57E−07 | −7.60E−09 | 1.89E−10 | 3.31E−13 |
| S4 | −1.45E−01 | 4.83E−04 | −8.33E−07 | 3.63E−08 | 1.78E−09 | −5.65E−11 | 6.72E−13 |
| S8 | −1.11E+00 | 4.73E−04 | −2.26E−06 | 3.98E−08 | 2.16E−09 | −1.17E−11 | 2.67E−13 |
| S9 | 7.23E+01 | 2.38E−04 | 4.75E−06 | −5.28E−08 | 8.00E−10 | 2.26E−10 | −2.62E−12 |
| S13 | −4.25E+00 | −7.29E−04 | −1.38E−05 | 5.26E−07 | −2.93E−08 | 6.16E−10 | 1.33E−12 |
| S14 | 9.85E+01 | −9.46E−04 | −9.93E−06 | 1.63E−07 | 6.96E−09 | −1.87E−10 | 5.37E−14 |

Example 3

Figure 3:
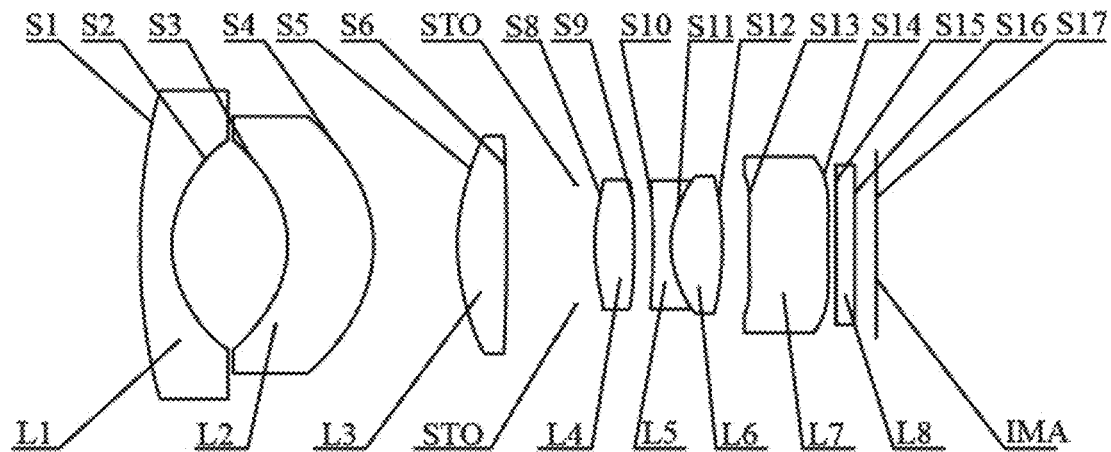
FIG. 3 is a schematic structural diagram showing an optical lens assembly according to Example 3 of the present disclosure.

An optical lens assembly according to Example 3 of the present disclosure is described below with reference to FIG. 3. FIG. 3 shows a schematic structural diagram of the optical lens assembly according to Example 3 of the present disclosure.

As shown in FIG. 3, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a biconvex lens having a positive refractive power, and an object-side surface S5 thereof is a convex surface and an image-side surface S6 thereof is a convex surface. The fourth lens L4 is a biconvex lens having a positive refractive power, and an object-side surface S8 thereof is a convex surface and an image-side surface S9 thereof is a convex surface. The fifth lens L5 is a biconcave lens having a negative refractive power, and an object-side surface S10 thereof is a concave surface and an image-side surface S11 thereof is a concave surface. The sixth lens L6 is a biconvex lens having a positive refractive power, and an object-side surface S11 thereof is a convex surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO, and the stop STO may be disposed between the third lens L3 and the fourth lens L4 to improve imaging quality. For example, the stop STO may be disposed at a position close to the object-side surface S8 of the fourth lens L4.

In this example, all of the object-side surface and the image-side surface of the second lens L2, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 5 shows radius of curvature R, thickness T, refractive index Nd and Abbe number Vd of each lens of the optical lens assembly in Example 3.

TABLE 5

| Surface No. | Radius of Curvature R (mm) | Thickness T (mm) | Refractive Index Nd | Abbe Number Vd |
|---|---|---|---|---|
| S1 | 45.3056 | 2.0000 | 1.77 | 49.61 |
| S2 | 7.1466 | 7.0799 | | |
| S3 | −6.4883 | 5.0000 | 1.59 | 61.16 |
| S4 | −8.0322 | 5.2905 | | |
| S5 | 12.7549 | 2.7799 | 1.62 | 63.41 |
| S6 | −119.8258 | 4.3579 | | |
| STO | Infinite | 1.1074 | | |
| S8 | 12.3068 | 2.0953 | 1.59 | 61.16 |
| S9 | −40.3547 | 1.1414 | | |
| S10 | −46.1894 | 1.2000 | 1.76 | 27.55 |
| S11 | 5.7421 | 3.1066 | 1.58 | 59.46 |
| S12 | −21.4927 | 1.5000 | | |
| S13 | 63.2651 | 5.1696 | 1.59 | 61.16 |
| S14 | 67.8800 | 0.3259 | | |
| S15 | Infinite | 1.0460 | 1.52 | 64.21 |
| S16 | Infinite | 1.2556 | | |
| IMA | Infinite | | | |

Table 6 below shows the conic coefficients k and the high-order coefficients A, B, C, D, E and F applicable to aspheric surfaces S3, S4, S8, S9, S13 and S14 in Example 3.

TABLE 6

| Surface No. | k | A | B | C | D | E | F |
|---|---|---|---|---|---|---|---|
| S3 | −2.08E−01 | 3.00E−04 | 3.16E−06 | 3.65E−09 | 2.20E−09 | −2.93E−11 | 3.31E−13 |
| S4 | −1.94E−01 | 1.63E−04 | 1.56E−06 | −3.52E−08 | 1.53E−09 | −2.28E−11 | 1.42E−13 |
| S8 | −6.24E+00 | 4.16E−04 | −3.03E−05 | 1.06E−06 | −9.27E−08 | 2.00E−10 | 2.67E−13 |
| S9 | 3.29E+01 | 7.55E−05 | −2.53E−05 | −1.31E−07 | −4.52E−08 | 3.60E−10 | −2.62E−12 |
| S13 | −9.90E+01 | −6.72E−04 | −2.82E−05 | 6.16E−07 | −7.82E−08 | 6.24E−10 | 1.33E−12 |
| S14 | 9.85E+01 | −9.07E−04 | −3.36E−05 | 3.26E−07 | 1.14E−08 | −1.89E−10 | 5.37E−14 |

Example 4

Figure 4:
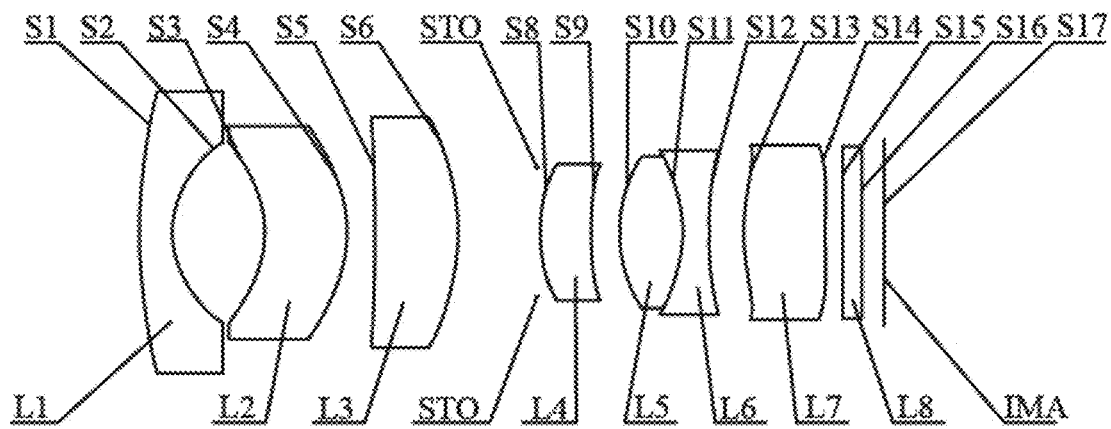
FIG. 4 is a schematic structural diagram showing an optical lens assembly according to Example 4 of the present disclosure.

An optical lens assembly according to Example 4 of the present disclosure is described below with reference to FIG. 4. FIG. 4 shows a schematic structural diagram of the optical lens assembly according to Example 4 of the present disclosure.

As shown in FIG. 4, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a meniscus lens having a positive refractive power, and an object-side surface S5 thereof is a concave surface and an image-side surface S6 thereof is a convex surface. The fourth lens L4 is a meniscus lens having a positive refractive power, and an object-side surface S8 thereof is a convex surface and an image-side surface S9 thereof is a concave surface. The fifth lens L5 is a biconvex lens having a positive refractive power, and an object-side surface S10 thereof is a convex surface and an image-side surface S11 thereof is a convex surface. The sixth lens L6 is a biconcave lens having a negative refractive power, and an object-side surface S11 thereof is a concave surface and an image-side surface S12 thereof is a concave surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the object-side surface S8 of the fourth lens L4.

In this example, all of the object-side surface and the image-side surface of the second lens L2, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 7 shows radius of curvature R, thickness T, refractive index Nd and Abbe number Vd of each lens of the optical lens assembly in Example 4.

TABLE 7

| Surface No. | Radius of Curvature R (mm) | Thickness T (mm) | Refractive Index Nd | Abbe Number Vd |
|---|---|---|---|---|
| S1 | 31.5337 | 2.0000 | 1.77 | 49.61 |
| S2 | 6.0469 | 5.5963 | | |
| S3 | −6.7519 | 5.0000 | 1.59 | 61.16 |
| S4 | −8.1062 | 1.6448 | | |
| S5 | −100.0000 | 5.0000 | 1.62 | 63.41 |
| S6 | −14.7388 | 4.8066 | | |
| STO | Infinite | 0.1000 | | |
| S8 | 11.4849 | 3.1289 | 1.59 | 61.16 |
| S9 | 24.8345 | 1.8698 | | |
| S10 | 9.9738 | 3.7540 | 1.50 | 81.59 |

TABLE 7-continued

| Surface No. | Radius of Curvature R (mm) | Thickness T (mm) | Refractive Index Nd | Abbe Number Vd |
|---|---|---|---|---|
| S11 | −7.8561 | 1.5000 | 1.79 | 44.21 |
| S12 | 44.3009 | 1.9766 | | |
| S13 | 12.3153 | 5.1941 | 1.59 | 61.16 |
| S14 | 58.2051 | 0.9481 | | |
| S15 | Infinite | 1.0460 | 1.52 | 64.21 |
| S16 | Infinite | 1.5374 | | |
| IMA | Infinite | | | |

Table 8 below shows the conic coefficients k and the high-order coefficients A, B, C, D, E and F applicable to aspheric surfaces S3, S4, S8, S9, S13 and S14 in Example 4.

TABLE 8

| Surface No. | k | A | B | C | D | E | F |
|---|---|---|---|---|---|---|---|
| S3 | 4.06E−02 | 3.78E−04 | 6.32E−06 | 2.25E−07 | −5.02E−09 | 1.00E−10 | 3.31E−13 |
| S4 | 4.55E−02 | 3.83E−04 | 1.97E−06 | 4.31E−09 | 1.49E−09 | −3.24E−11 | 2.73E−13 |
| S8 | −8.22E−01 | 6.11E−04 | 4.72E−06 | −7.67E−10 | 6.19E−09 | 1.08E−12 | 2.67E−13 |
| S9 | −1.26E+01 | 5.59E−04 | 1.15E−05 | −2.61E−07 | 2.05E−08 | 3.60E−10 | −2.62E−12 |
| S13 | 1.15E+00 | −7.17E−04 | −1.06E−05 | 2.55E−07 | −2.76E−08 | 6.16E−10 | 1.33E−12 |
| S14 | 9.85E+01 | −7.28E−04 | −1.12E−05 | −1.69E−07 | 1.50E−08 | −1.95E−10 | 5.37E−14 |

Example 5

Figure 5:
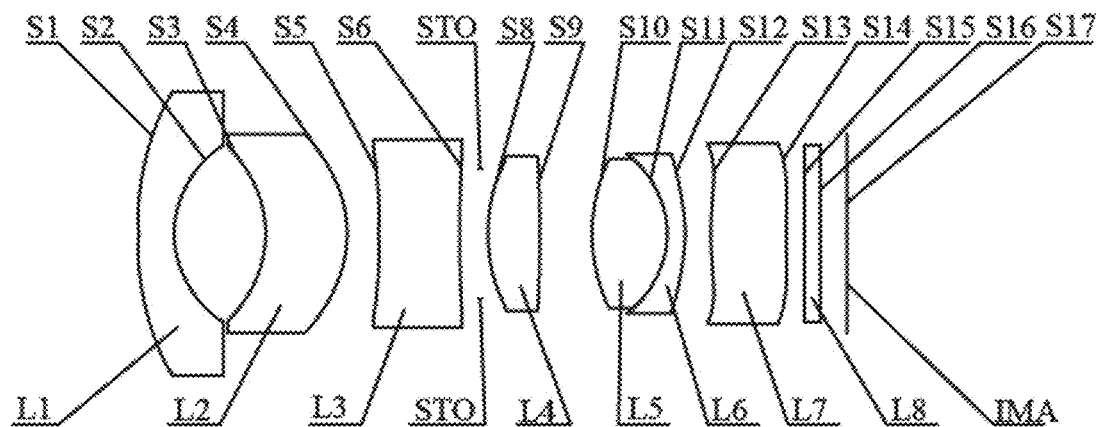
FIG. 5 is a schematic structural diagram showing an optical lens assembly according to Example 5 of the present disclosure.

An optical lens assembly according to Example 5 of the present disclosure is described below with reference to FIG. 5. FIG. 5 shows a schematic structural diagram of the optical lens assembly according to Example 5 of the present disclosure.

As shown in FIG. 5, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a biconcave lens having a negative refractive power, and an object-side surface S5 thereof is a concave surface and an image-side surface S6 thereof is a concave surface. The fourth lens L4 is a biconvex lens having a positive refractive power, and an object-side surface S8 thereof is a convex surface and an image-side surface S9 thereof is a convex surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality.

In this example, all of the object-side surface and the image-side surface of the second lens L2, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 9 shows radius of curvature R, thickness T, refractive index Nd and Abbe number Vd of each lens of the optical lens assembly in Example 5.

TABLE 9

| Surface No. | Radius of Curvature R (mm) | Thickness T (mm) | Refractive Index Nd | Abbe Number Vd |
|---|---|---|---|---|
| S1 | 27.0674 | 2.1741 | 1.77 | 49.61 |
| S2 | 6.1112 | 5.2735 | | |
| S3 | −6.5902 | 5.4921 | 1.62 | 63.41 |
| S4 | −7.2336 | 1.6970 | | |
| S5 | −307.2124 | 5.0000 | 1.59 | 61.16 |
| S6 | 227.2451 | 1.4583 | | |
| STO | Infinite | 0.1034 | | |
| S8 | 10.9385 | 3.5508 | 1.59 | 61.16 |
| S9 | −56.3304 | 3.1130 | | |
| S10 | 10.4516 | 4.0807 | 1.52 | 64.21 |
| S11 | −5.7307 | 1.2126 | 1.79 | 47.52 |
| S12 | −162.7694 | 1.7124 | | |
| S13 | 18.4464 | 4.7434 | 1.59 | 61.16 |
| S14 | 58.2176 | 1.0540 | | |
| S15 | Infinite | 1.0500 | 1.52 | 64.21 |
| S16 | Infinite | 1.5692 | | |
| IMA | Infinite | | | |

Table 10 below shows the conic coefficients k and the high-order coefficients A, B, C, D, E and F applicable to aspheric surfaces S3, S4, S8, S9, S13 and S14 in Example 5.

TABLE 10

| Surface No. | k | A | B | C | D | E | F |
|---|---|---|---|---|---|---|---|
| S3 | 9.13E−02 | 4.29E−04 | 2.95E−06 | 1.79E−07 | −6.01E−09 | 1.26E−10 | −1.08E−13 |
| S4 | −9.63E−02 | 4.13E−04 | −2.91E−06 | 6.26E−08 | 2.09E−09 | −4.64E−11 | 3.81E−13 |
| S8 | −5.57E−01 | 4.75E−04 | −1.01E−06 | −9.84E−09 | 4.75E−09 | 1.03E−10 | −7.48E−11 |
| S9 | −2.39E+02 | 4.71E−04 | −1.03E−05 | −3.35E−07 | −1.14E−08 | −8.95E−10 | 5.52E−11 |
| S13 | −9.85E+00 | −7.19E−04 | −1.22E−05 | 3.50E−07 | −2.46E−08 | 4.37E−10 | 4.88E−12 |
| S14 | 1.02E+02 | −9.01E−04 | −7.40E−06 | 1.39E−07 | 5.05E−09 | −1.33E−10 | −2.71E−13 |

Example 6

Figure 6:
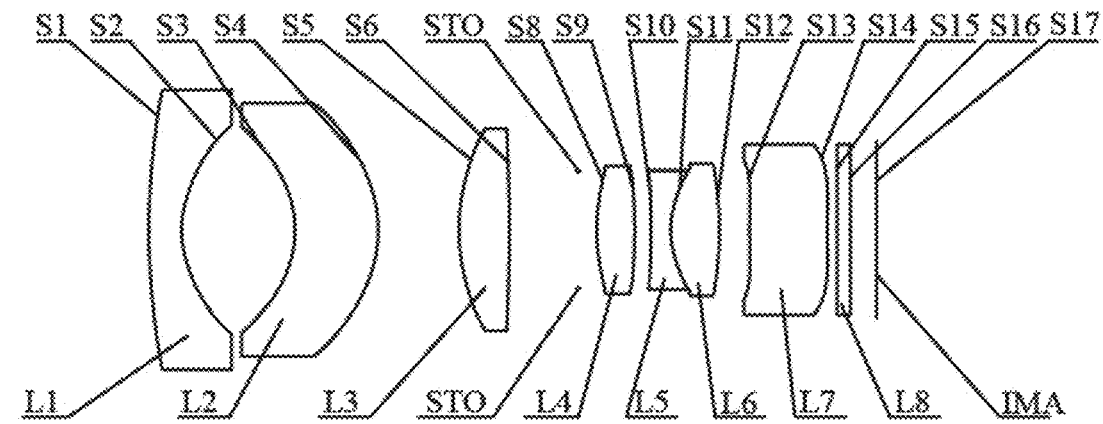
FIG. 6 is a schematic structural diagram showing an optical lens assembly according to Example 6 of the present disclosure.

An optical lens assembly according to Example 6 of the present disclosure is described below with reference to FIG. 6. FIG. 6 shows a schematic structural diagram of the optical lens assembly according to Example 6 of the present disclosure.

As shown in FIG. 6, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a positive refractive power, and an object-side surface S3 thereof is a concave surface and an image-side surface S4 thereof is a convex surface. The third lens L3 is a biconvex lens having a positive refractive power, and an object-side surface S5 thereof is a convex surface and an image-side surface S6 thereof is a convex surface. The fourth lens L4 is a biconvex lens having a positive refractive power, and an object-side surface S8 thereof is a convex surface and an image-side surface S9 thereof is a convex surface. The fifth lens L5 is a biconcave lens having a negative refractive power, and an object-side surface S10 thereof is a concave surface and an image-side surface S11 thereof is a concave surface. The sixth lens L6 is a biconvex lens having a positive refractive power, and an object-side surface S11 thereof is a convex surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the object-side surface S8 of the fourth lens L4.

In this example, all of the object-side surface and the image-side surface of the second lens L2, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 11 shows radius of curvature R, thickness T, refractive index Nd and Abbe number Vd of each lens of the optical lens assembly in Example 6.

TABLE 11

| Surface No. | Radius of Curvature R (mm) | Thickness T (mm) | Refractive Index Nd | Abbe Number Vd |
|---|---|---|---|---|
| S1 | 45.3056 | 2.0000 | 1.77 | 49.61 |
| S2 | 7.1466 | 7.0799 | | |
| S3 | −6.4883 | 5.0000 | 1.59 | 61.16 |
| S4 | −8.0322 | 5.2905 | | |
| S5 | 12.7549 | 2.7799 | 1.62 | 63.41 |
| S6 | −119.8258 | 4.3579 | | |
| STO | Infinite | 1.1074 | | |
| S8 | 12.3068 | 2.0953 | 1.59 | 61.16 |
| S9 | −40.3547 | 1.1414 | | |
| S10 | −46.1894 | 1.2000 | 1.76 | 27.55 |
| S11 | 5.7421 | 3.1066 | 1.57 | 56.06 |
| S12 | −21.4927 | 1.5000 | | |
| S13 | 63.2651 | 5.1696 | 1.59 | 61.16 |
| S14 | 67.8800 | 0.3259 | | |
| S15 | Infinite | 1.0460 | 1.52 | 64.21 |
| S16 | Infinite | 1.5233 | | |
| IMA | Infinite | | | |

Table 12 below shows the conic coefficients k and the high-order coefficients A, B, C, D, E and F applicable to aspheric surfaces S3, S4, S8, S9, S13 and S14 in Example 6.

TABLE 12

| Surface No. | k | A | B | C | D | E | F |
|---|---|---|---|---|---|---|---|
| S3 | −2.08E−01 | 3.00E−04 | 3.16E−06 | 3.65E−09 | 2.20E−09 | −2.93E−11 | 3.31E−13 |
| S4 | −1.94E−01 | 1.63E−04 | 2.36E−06 | −3.52E−08 | 1.53E−09 | −2.58E−11 | 1.42E−13 |
| S8 | −6.24E+00 | 4.16E−04 | −3.03E−05 | 1.06E−06 | −9.27E−08 | 2.00E−10 | 2.67E−13 |
| S9 | 3.29E+01 | 7.55E−05 | −2.23E−05 | −1.31E−07 | −4.52E−08 | 3.60E−10 | −2.62E−12 |
| S13 | −1.10E+02 | −6.72E−04 | −3.82E−05 | 6.16E−07 | −7.82E−08 | 6.24E−10 | 1.33E−12 |
| S14 | 9.85E+01 | −9.07E−04 | −3.36E−05 | 3.26E−07 | 1.14E−08 | −1.89E−10 | 5.37E−14 |

Examples 1 to 6 respectively satisfy the relationship shown in the following Table 13. In Table 13, the units of d1, d2, d3, d4, d5, d6, d7, dn(max), dm(min) are millimeter (mm).

d1 to d7 respectively correspond to the center thicknesses of the first lens to the seventh lens along the optical axis; dn(max) is the maximum center thickness in the axial center thicknesses of the first lens to the seventh lens; dm (min) is the minimum center thickness in the axial center thicknesses of the first lens to the seventh lens; max{dn:dm} is a maximum value in ratios between axial center thicknesses of any two lenses among the first lens to seventh lens, i.e., p mentioned in above description.

TABLE 13

| Conditional/ Example | Example 1 | Example 2 | Example 3 | Example 4 | Example 5 | Example 6 |
|---|---|---|---|---|---|---|
| d1 | 2.0000 | 2.0000 | 2.0000 | 2.0000 | 2.1741 | 2.0000 |
| d2 | 5.0000 | 5.0000 | 5.0000 | 5.0000 | 5.4921 | 5.0000 |
| d3 | 5.0000 | 5.0000 | 2.7799 | 5.0000 | 5.0000 | 2.7799 |
| d4 | 3.1289 | 3.9109 | 2.0953 | 3.1289 | 3.5508 | 2.0953 |
| d5 | 3.7540 | 4.2879 | 1.2000 | 3.7540 | 4.0807 | 1.2000 |
| d6 | 1.6000 | 1.3000 | 3.1066 | 1.5000 | 1.2126 | 3.1066 |
| d7 | 5.1941 | 4.6747 | 5.1696 | 5.1941 | 4.7434 | 5.1696 |
| dn(max) | 5.1941 | 5.0000 | 5.1696 | 5.1941 | 5.4921 | 5.1696 |
| dm(min) | 1.6000 | 1.3000 | 1.2000 | 1.5000 | 1.2126 | 1.2000 |
| max{dn:dm} | 3.2463 | 3.8462 | 4.3080 | 3.4627 | 4.5291 | 4.3080 |

Example 7

Figure 7:
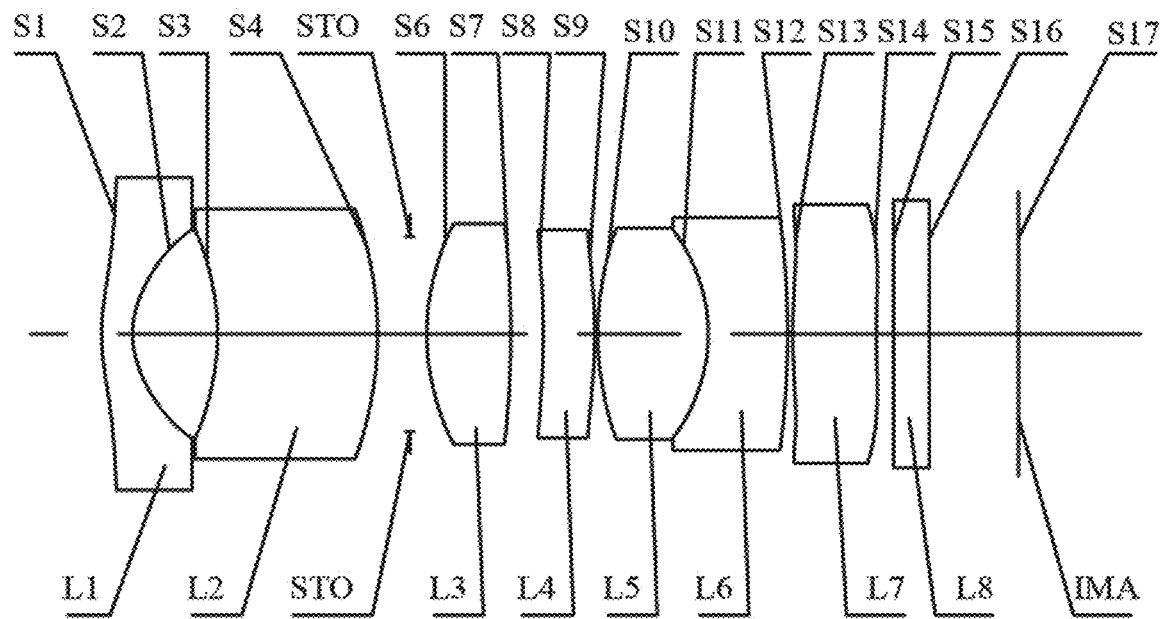
FIG. 7 is a schematic structural diagram showing an optical lens assembly according to Example 7 of the present disclosure.

An optical lens assembly according to Example 7 of the present disclosure is described below with reference to FIG. 7. FIG. 7 shows a schematic structural diagram of the optical lens assembly according to Example 7 of the present disclosure.

As shown in FIG. 7, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a negative refractive power, and an object-side surface S3 thereof is a concave surface and an image-side surface S4 thereof is a convex surface. The third lens L3 is a biconvex lens having a positive refractive power, and an object-side surface S6 thereof is a convex surface and an image-side surface S7 thereof is a convex surface. The fourth lens L4 is a meniscus lens having a positive refractive power, and an object-side surface S8 thereof is a concave surface and an image-side surface S9 thereof is a convex surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the second lens L2 and the third lens L3 to improve imaging quality. For example, the stop STO may be disposed at a position close to the image-side surface S4 of the second lens L2.

In this example, all of the object-side surface and the image-side surface of the first lens L1, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the respective surfaces S1 to S16 and is finally imaged on the imaging plane S17.

Table 14 shows radius of curvature R, thickness T (it should be appreciated that the thickness T in the row where S1 is located is the center thickness of the first lens L1, the thickness T in the row where S2 is located is the air gap d12 between the first lens L1 and the second lens L2, and so on), refractive index Nd and abbe number Vd of each lens of the optical lens assembly in Example 7.

TABLE 14

| Surface No. | Radius of Curvature R (mm) | Thickness T (mm) | Refractive Index Nd | Abbe Number Vd |
|---|---|---|---|---|
| S1 | 6.0248 | 0.9050 | 1.59 | 61.16 |
| S2 | 2.5462 | 2.4900 | | |
| S3 | −7.4814 | 4.7000 | 1.85 | 23.79 |
| S4 | −10.4972 | 0.9556 | | |
| STO | Infinite | 0.5000 | | |
| S6 | 7.0906 | 2.4580 | 1.62 | 63.41 |
| S7 | −28.2274 | 0.9489 | | |
| S8 | −25.2263 | 1.5073 | 1.59 | 61.25 |
| S9 | −17.7910 | 0.1000 | | |
| S10 | 9.1360 | 3.2296 | 1.50 | 81.59 |
| S11 | −5.0191 | 2.3354 | 1.85 | 23.79 |
| S12 | −26.1734 | 0.1482 | | |
| S13 | 16.2224 | 2.4592 | 1.59 | 61.25 |
| S14 | 25.8664 | 0.5000 | | |
| S15 | Infinite | 1.0500 | 1.52 | 64.21 |
| S16 | Infinite | 2.6149 | | |
| IMA | Infinite | 8.3468 | | |

Table 15 below shows the conic coefficients k and the high-order coefficients A, B, C, D, E and F applicable to aspheric surfaces S1, S2, S8, S9, S13 and S14 in Example 7.

TABLE 15

| Surface No. | k | A | B | C | D | E | F |
|---|---|---|---|---|---|---|---|
| S1 | −8.6121 | −5.0316E−03 | 3.9273E−04 | −1.7811E−05 | 4.6377E−07 | −5.3068E−09 | −3.3430E−12 |
| S2 | −1.0931 | −8.9657E−03 | 1.3765E−03 | −1.0080E−04 | 5.4080E−06 | 2.2167E−09 | 2.3398E−09 |
| S8 | 1.3447 | 1.0766E−04 | 9.3327E−06 | 3.9776E−06 | −1.0435E−07 | −3.6960E−09 | −5.0236E−10 |
| S9 | 0.5701 | 9.9179E−05 | 5.5981E−05 | 1.7244E−06 | −3.5205E−09 | −6.9574E−09 | 1.6033E−10 |
| S13 | −5.0799 | −2.7587E−03 | 3.3126E−05 | 1.4172E−06 | −6.0270E−09 | 1.6360E−09 | −1.4752E−10 |
| S14 | −64.7854 | −3.2058E−03 | 5.7797E−05 | 4.9622E−07 | −2.1064E−08 | 1.8172E−09 | −2.4383E−11 |

Example 8

Figure 8:
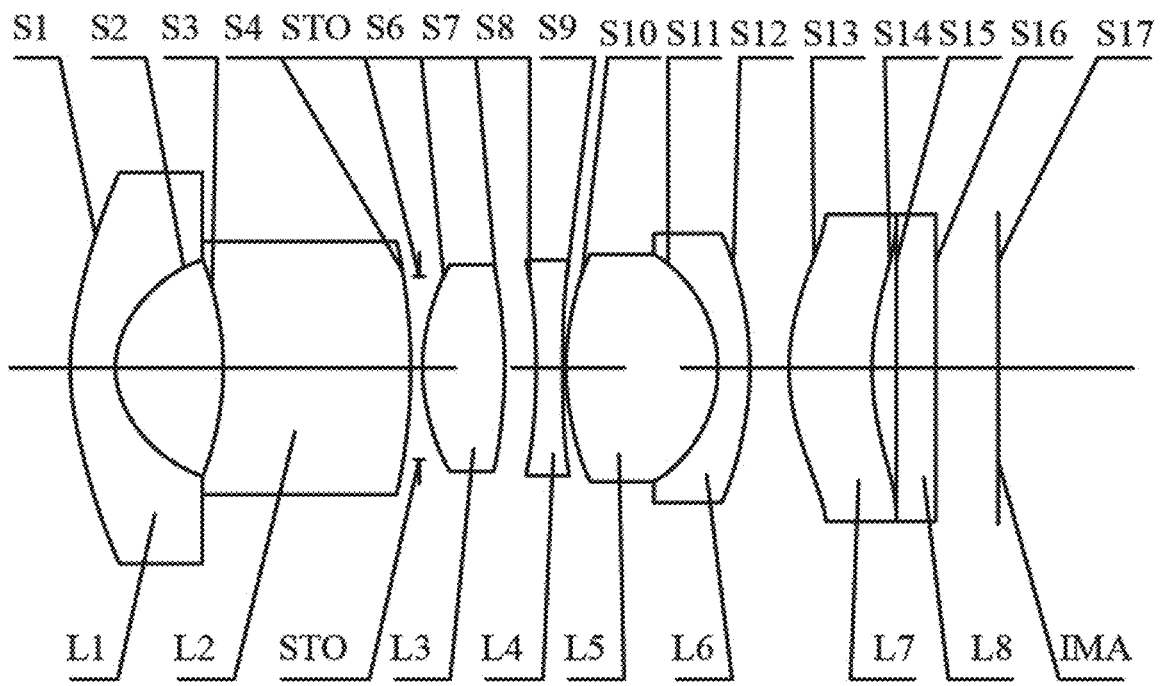
FIG. 8 is a schematic structural diagram showing an optical lens assembly according to Example 8 of the present disclosure.

An optical lens assembly according to Example 8 of the present disclosure is described below with reference to FIG. 8. FIG. 8 shows a schematic structural diagram of the optical lens assembly according to Example 8 of the present disclosure.

As shown in FIG. 8, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a negative refractive power, and an object-side surface S3 thereof is a concave surface and an image-side surface S4 thereof is a convex surface. The third lens L3 is a biconvex lens having a positive refractive power, and an object-side surface S6 thereof is a convex surface and an image-side surface S7 thereof is a convex surface. The fourth lens L4 is a lens having a negative refractive power, and an object-side surface S8 thereof is a concave surface and an image-side surface S9 thereof is a concave surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality.

In this example, all of the object-side surface and the image-side surface of the first lens L1, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 16 shows radius of curvature R, thickness T, refractive index Nd and Abbe number Vd of each lens of the optical lens assembly in Example 8.

TABLE 16

| Surface No. | Radius of Curvature R (mm) | Thickness T (mm) | Refractive Index Nd | Abbe Number Vd |
|---|---|---|---|---|
| S1 | 6.2589 | 1.2000 | 1.59 | 61.16 |
| S2 | 2.2448 | 2.8592 | | |
| S3 | −7.8234 | 4.9799 | 1.65 | 55.90 |
| S4 | −15.2814 | 0.2247 | | |
| STO | Infinite | 0.1000 | | |
| S6 | 5.6006 | 2.1651 | 1.62 | 63.41 |
| S7 | −13.2867 | 0.8413 | | |
| S8 | −17.7443 | 0.7000 | 1.59 | 61.16 |
| S9 | 36.4457 | 0.1000 | | |
| S10 | 7.5612 | 4.0140 | 1.49 | 70.42 |
| S11 | −3.5486 | 0.8487 | 1.85 | 23.79 |
| S12 | −8.9621 | 1.0504 | | |

TABLE 16-continued

| Surface No. | Radius of Curvature R (mm) | Thickness T (mm) | Refractive Index Nd | Abbe Number Vd |
|---|---|---|---|---|
| S13 | 5.6389 | 2.2035 | 1.59 | 61.16 |
| S14 | 7.0942 | 0.6414 | | |
| S15 | Infinite | 1.0500 | 1.52 | 64.21 |
| S16 | Infinite | 1.6541 | | |
| IMA | Infinite | 8.3154 | | |

Table 17 below shows the conic coefficients k and the high-order coefficients A, B, C, D, E and F applicable to aspheric surfaces S1, S2, S8, S9, S13 and S14 in Example 8.

TABLE 17

| Surface No. | k | A | B | C | D | E | F |
|---|---|---|---|---|---|---|---|
| S1 | 0.1253 | −5.1880E−03 | 3.5150E−04 | −1.7414E−05 | 4.5977E−07 | −5.6025E−09 | 6.0397E−12 |
| S2 | −0.4627 | −7.8130E−03 | 3.3192E−04 | 1.4159E−05 | −3.1150E−06 | −8.4308E−08 | −5.1591E−09 |
| S8 | 23.2794 | −8.4908E−05 | 5.5277E−05 | −9.4002E−06 | 8.9923E−07 | −9.9064E−09 | −5.9767E−09 |
| S9 | 96.1771 | 2.6816E−04 | 5.2012E−05 | −1.0645E−06 | −1.8913E−07 | −3.0919E−08 | 5.9905E−09 |
| S13 | −0.5644 | −1.5642E−03 | 6.5637E−06 | −2.4673E−06 | −3.0164E−08 | −9.3978E−11 | −1.2741E−10 |
| S14 | −0.0829 | −1.7987E−03 | 7.2015E−05 | −1.0871E−05 | 2.9941E−07 | −7.7890E−10 | −2.7160E−10 |

Example 9

Figure 9:
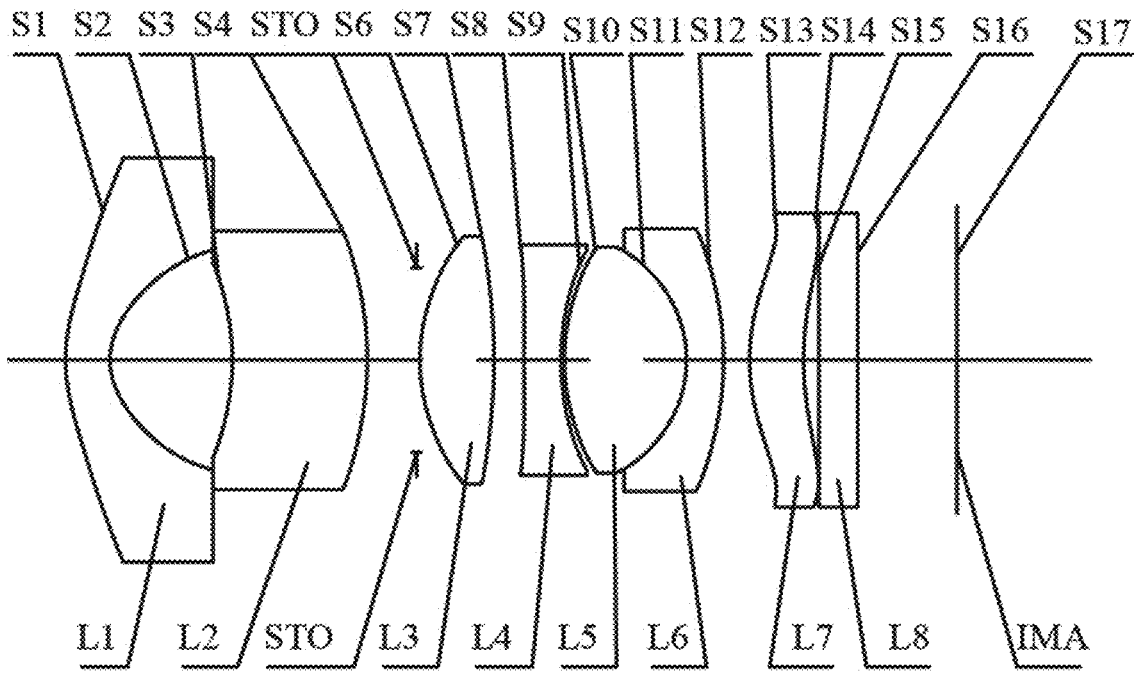
FIG. 9 is a schematic structural diagram showing an optical lens assembly according to Example 9 of the present disclosure.

An optical lens assembly according to Example 9 of the present disclosure is described below with reference to FIG. 9. FIG. 9 shows a schematic structural diagram of the optical lens assembly according to Example 9 of the present disclosure.

As shown in FIG. 9, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a negative refractive power, and an object-side surface S3 thereof is a concave surface and an image-side surface S4 thereof is a convex surface. The third lens L3 is a biconvex lens having a positive refractive power, and an object-side surface S6 thereof is a convex surface and an image-side surface S7 thereof is a convex surface. The fourth lens L4 is a meniscus lens having a negative refractive power, and an object-side surface S8 thereof is a convex surface and an image-side surface S9 thereof is a concave surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the object-side surface S6 of the third lens L3.

In this example, all of the object-side surface and the image-side surface of the first lens L1, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 18 shows radius of curvature R, thickness T, refractive index Nd and Abbe number Vd of each lens of the optical lens assembly in Example 9.

TABLE 18

| Surface No. | Radius of Curvature R (mm) | Thickness T (mm) | Refractive Index Nd | Abbe Number Vd |
|---|---|---|---|---|
| S1 | 4.3796 | 1.2000 | 1.59 | 61.16 |
| S2 | 1.8553 | 3.2873 | | |
| S3 | −6.9178 | 3.6344 | 1.69 | 49.23 |
| S4 | −9.6411 | 1.3351 | | |
| STO | Infinite | 0.1000 | | |
| S6 | 5.3474 | 1.9765 | 1.62 | 60.37 |
| S7 | −17.2394 | 0.8093 | | |
| S8 | 120.0000 | 1.0000 | 1.59 | 61.16 |
| S9 | 6.8901 | 0.1000 | | |
| S10 | 5.8237 | 3.2696 | 1.50 | 81.59 |
| S11 | −3.4047 | 1.0000 | 1.85 | 23.79 |
| S12 | −8.9146 | 0.7064 | | |
| S13 | 5.3848 | 1.4554 | 1.59 | 61.16 |
| S14 | 8.0591 | 0.4069 | | |
| S15 | Infinite | 1.0500 | 1.52 | 64.21 |
| S16 | Infinite | 2.6734 | | |
| IMA | | | | |

Table 19 below shows the conic coefficients k and the high-order coefficients A, B, C, D, E and F applicable to aspheric surfaces S1, S2, S8, S9, S13 and S14 in Example 9.

TABLE 19

| Surface No. | k | A | B | C | D | E | F |
|---|---|---|---|---|---|---|---|
| S1 | −1.1808 | −6.9706E−03 | 4.3652E−04 | −1.6320E−05 | 3.4132E−07 | −3.1525E−09 | 3.0514E−12 |
| S2 | −0.6520 | −1.2910E−02 | 5.1764E−04 | −3.7246E−06 | −2.5544E−06 | 2.7265E−09 | 2.4055E−09 |
| S8 | −99.0000 | −1.6697E−03 | 1.2784E−04 | −1.8930E−05 | 8.4212E−07 | −3.7826E−09 | −5.1172E−10 |
| S9 | 2.2552 | −1.7364E−03 | 1.7735E−04 | −1.6706E−05 | 3.6523E−07 | −7.0350E−09 | 1.4336E−10 |
| S13 | −1.2000 | −1.7521E−03 | −7.6970E−06 | −3.0484E−06 | −1.7010E−07 | 1.6820E−09 | −1.4363E−10 |
| S14 | 0.2328 | −1.9796E−03 | 1.3886E−05 | −8.1978E−06 | 1.2570E−07 | 1.8044E−09 | −2.5365E−11 |

Example 10

Figure 10:
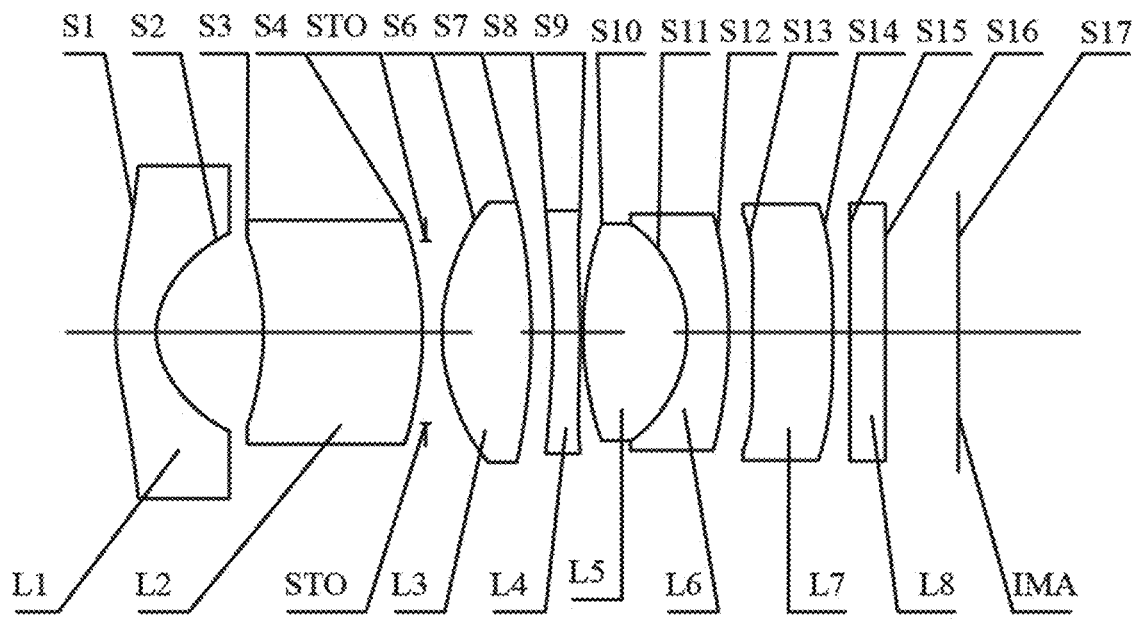
FIG. 10 is a schematic structural diagram showing an optical lens assembly according to Example 10 of the present disclosure.

An optical lens assembly according to Example 10 of the present disclosure is described below with reference to FIG. 10. FIG. 10 shows a schematic structural diagram of the optical lens assembly according to Example 10 of the present disclosure.

As shown in FIG. 10, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a negative refractive power, and an object-side surface S3 thereof is a concave surface and an image-side surface S4 thereof is a convex surface. The third lens L3 is a biconvex lens having a positive refractive power, and an object-side surface S6 thereof is a convex surface and an image-side surface S7 thereof is a convex surface. The fourth lens L4 is a meniscus lens having a negative refractive power, and an object-side surface S8 thereof is a concave surface and an image-side surface S9 thereof is a convex surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a convex surface and an image-side surface S14 thereof is a concave surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the image-side surface S4 of the second lens L2.

In this example, all of the object-side surface and the image-side surface of the first lens L1, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 20 shows radius of curvature R, thickness T, refractive index Nd and Abbe number Vd of each lens of the optical lens assembly in Example 10.

TABLE 20

| Surface No. | Radius of Curvature R (mm) | Thickness T (mm) | Refractive Index Nd | Abbe Number Vd |
|---|---|---|---|---|
| S1 | 6.2314 | 1.2000 | 1.59 | 61.16 |
| S2 | 2.1698 | 3.1671 | | |
| S3 | −8.2607 | 4.7119 | 1.83 | 42.73 |
| S4 | −10.6790 | 0.1000 | | |
| STO | Infinite | 0.5000 | | |
| S6 | 6.1380 | 2.6249 | 1.62 | 63.41 |
| S7 | −17.3190 | 0.6486 | | |
| S8 | −22.0886 | 0.8000 | 1.59 | 61.25 |
| S9 | −37.6453 | 0.1000 | | |
| S10 | 9.7648 | 3.0632 | 1.50 | 81.59 |
| S11 | −3.9378 | 1.2371 | 1.81 | 22.69 |
| S12 | −13.5055 | 0.7047 | | |
| S13 | 41.6484 | 2.3861 | 1.59 | 61.25 |
| S14 | −99.0000 | 0.5000 | | |
| S15 | Infinite | 1.0500 | 1.52 | 64.21 |
| S16 | Infinite | 2.1698 | | |
| IMA | Infinite | 8.2591 | | |

Table 21 below shows the conic coefficients k and the high-order coefficients A, B, C, D, E and F applicable to aspheric surfaces S1, S2, S8, S9, S13 and S14 in Example 10.

TABLE 21

| Surface No. | k | A | B | C | D | E | F |
|---|---|---|---|---|---|---|---|
| S1 | −2.6214 | −5.5540E−03 | 3.9917E−04 | −1.7378E−05 | 4.1560E−07 | −4.0953E−09 | −3.4134E−12 |
| S2 | −0.8024 | −7.1093E−03 | 8.3126E−04 | −3.2994E−05 | 2.8793E−06 | 2.7265E−09 | 2.4055E−09 |
| S8 | −12.6548 | 2.1566E−04 | 3.7986E−05 | −1.7930E−06 | −2.7719E−08 | −3.7826E−09 | −5.1172E−10 |
| S9 | −44.2437 | 5.0957E−04 | 3.7498E−05 | 4.6175E−06 | −4.1967E−07 | −7.0350E−09 | 1.4336E−10 |
| S13 | −64.7528 | −3.0964E−03 | 2.9983E−05 | 1.8027E−06 | −1.4749E−07 | 1.6820E−09 | −1.4363E−10 |
| S14 | 99.0000 | −2.7820E−03 | 9.1285E−05 | −7.6613E−07 | −6.0145E−08 | 1.8044E−09 | −2.5365E−11 |

Example 11

Figure 11:
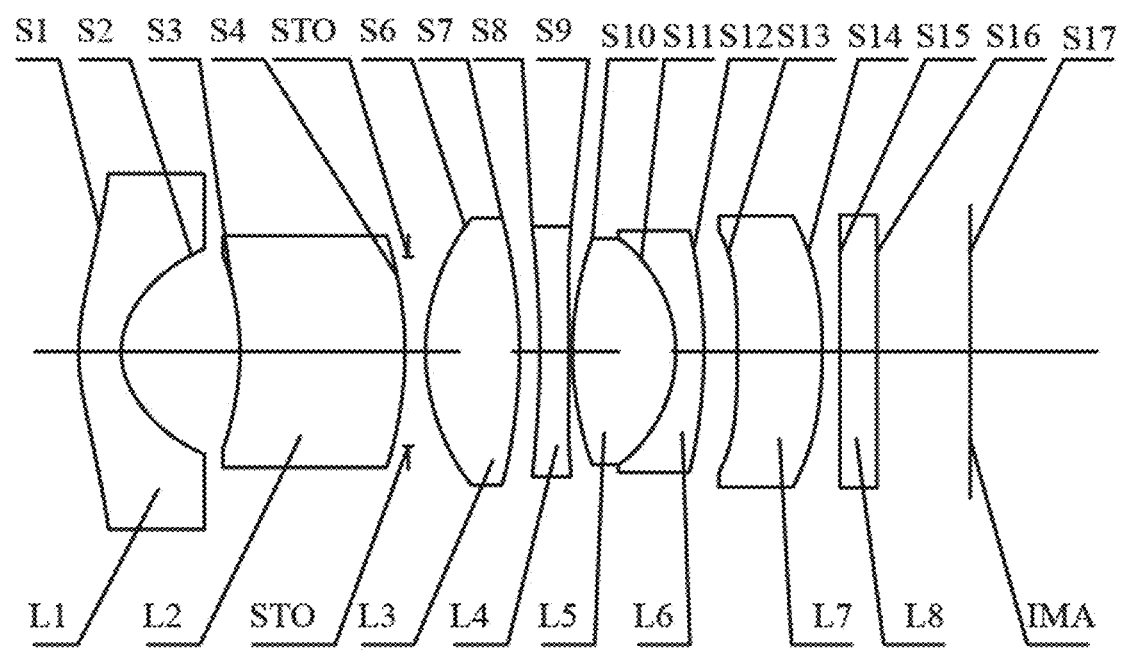
FIG. 11 is a schematic structural diagram showing an optical lens assembly according to Example 11 of the present disclosure.

An optical lens assembly according to Example 11 of the present disclosure is described below with reference to FIG. 11. FIG. 11 shows a schematic structural diagram of the optical lens assembly according to Example 11 of the present disclosure.

As shown in FIG. 11, the optical lens assembly includes a first lens L1, a second lens L2, a third lens L3, a fourth lens L4, a fifth lens L5, a sixth lens L6 and a seventh lens L7, which are sequentially arranged along an optical axis from an object side to an image side of the optical lens assembly.

The first lens L1 is a meniscus lens having a negative refractive power, and an object-side surface S1 thereof is a convex surface and an image-side surface S2 thereof is a concave surface. The second lens L2 is a meniscus lens having a negative refractive power, and an object-side surface S3 thereof is a concave surface and an image-side surface S4 thereof is a convex surface. The third lens L3 is a biconvex lens having a positive refractive power, and an object-side surface S6 thereof is a convex surface and an image-side surface S7 thereof is a convex surface. The fourth lens L4 is a meniscus lens having a negative refractive power, and an object-side surface S8 thereof is a concave surface and an image-side surface S9 thereof is a convex surface. The fifth lens L5 is a biconvex lens having a positive refractive power, and an object-side surface S10 thereof is a convex surface and an image-side surface S11 thereof is a convex surface. The sixth lens L6 is a meniscus lens having a negative refractive power, and an object-side surface S11 thereof is a concave surface and an image-side surface S12 thereof is a convex surface. The seventh lens L7 is a meniscus lens having a positive refractive power, and an object-side surface S13 thereof is a concave surface and an image-side surface S14 thereof is a convex surface. The fifth lens L5 and the sixth lens L6 are cemented to form a cemented lens.

The optical lens assembly may further include a stop STO disposed between the third lens L3 and the fourth lens L4 to improve imaging quality. For example, the stop STO may be disposed at a position close to the image-side surface S4 of the second lens L2.

In this example, all of the object-side surface and the image-side surface of the first lens L1, the object-side-surface and the image-side surface of the fourth lens L4, and the object-side surface and the image-side surface of the seventh lens L7 may be aspheric.

Alternatively, the optical lens assembly may further include an optical filter L8 and/or a protective glass L8', having an object-side surface S15 and an image-side surface S16. The optical filter L8 may be used to correct color deviations. The protective glass L8' may be used to protect an image sensing chip IMA arranged on an imaging plane S17. Light from an object sequentially passes through the surfaces S1 to S16 and is finally imaged on the imaging plane S17.

Table 22 shows radius of curvature R, thickness T, refractive index Nd and Abbe number Vd of each lens of the optical lens assembly in Example 11.

TABLE 22

| Surface No. | Radius of Curvature R (mm) | Thickness T (mm) | Refractive Index Nd | Abbe Number Vd |
|---|---|---|---|---|
| S1 | 5.7105 | 1.2000 | 1.59 | 61.16 |
| S2 | 2.0328 | 3.3520 | | |
| S3 | −8.0506 | 4.6584 | 1.83 | 42.73 |
| S4 | −10.6144 | 0.1000 | | |
| STO | Infinite | 0.5000 | | |
| S6 | 6.1351 | 2.6335 | 1.62 | 63.41 |
| S7 | −14.7554 | 0.5800 | | |
| S8 | −23.9561 | 0.8284 | 1.59 | 61.25 |
| S9 | −78.3253 | 0.1000 | | |
| S10 | 9.4104 | 2.9000 | 1.50 | 81.59 |
| S11 | −3.9775 | 0.8000 | 1.85 | 23.79 |
| S12 | −14.5002 | 0.9472 | | |
| S13 | −89.0000 | 2.3959 | 1.59 | 61.25 |
| S14 | −15.3547 | 0.5000 | | |
| S15 | Infinite | 1.0500 | 1.52 | 64.21 |
| S16 | Infinite | 2.6262 | | |
| IMA | Infinite | 8.2829 | | |

Table 23 below shows the conic coefficients k and the high-order coefficients A, B, C, D, E and F applicable to aspheric surfaces S1, S2, S8, S9, S13 and S14 in Example 11.

TABLE 23

| Surface No. | K | A | B | C | D | E | F |
|---|---|---|---|---|---|---|---|
| S1 | −2.46E+00 | −5.48E−03 | 4.03E−04 | −1.74E−05 | 4.04E−07 | −3.80E−09 | −3.41E−12 |
| S2 | −7.24E−01 | −8.25E−03 | 7.63E−04 | −2.30E−05 | 2.53E−06 | 2.73E−09 | 2.41E−09 |
| S8 | −1.39E+01 | 2.23E−04 | 3.19E−05 | −3.41E−06 | 3.96E−08 | −3.78E−09 | −5.12E−10 |
| S9 | −9.90E+01 | 5.84E−04 | 3.20E−05 | 3.49E−06 | −4.07E−07 | −7.04E−09 | 1.43E−10 |
| S13 | 9.90E+01 | −3.88E−03 | 2.82E−05 | 5.33E−06 | −3.20E−07 | 1.68E−09 | −1.44E−10 |
| S14 | 1.67E+00 | −2.79E−03 | 1.07E−04 | −2.00E−07 | −9.68E−08 | 1.80E−09 | −2.54E−11 |

Examples 7 to 11 respectively satisfy the relationship shown in the following Table 24. In Table 24, the units of d1, d2, d3, d4, d5, d6, d7, dn(max), dm(min) are millimeter (mm).

d1 to d7 respectively correspond to the axial center thicknesses of the first lens to the seventh lens; dn(max) is the maximum center thickness in the axial center thicknesses of the first lens to the seventh lens; dm (min) is the minimum center thickness in the axial center thicknesses of the first lens to the seventh lens; max{dn:dm} is a maximum value in ratios between axial center thicknesses of any two lenses among the first lens to seventh lens, i.e., p mentioned in above description.

TABLE 24

| Conditional/Example | Example 7 | Example 8 | Example 9 | Example 10 | Example 11 |
|---|---|---|---|---|---|
| d1 | 0.9050 | 1.2000 | 1.2000 | 1.2000 | 1.2000 |
| d2 | 4.7000 | 4.9799 | 3.6344 | 4.7119 | 4.6584 |
| d3 | 2.4580 | 2.1651 | 1.9765 | 2.6249 | 2.6335 |
| d4 | 1.5073 | 0.7000 | 1.0000 | 0.8000 | 0.8284 |
| d5 | 3.2296 | 4.0140 | 3.2696 | 3.0632 | 2.9000 |
| d6 | 2.3354 | 0.8487 | 1.0000 | 1.2371 | 0.8000 |
| d7 | 2.4592 | 2.2035 | 1.4554 | 2.3861 | 2.3959 |
| dn(max) | 4.7000 | 4.9799 | 3.6344 | 4.7119 | 4.6584 |
| dm(min) | 0.9050 | 0.7000 | 1.0000 | 0.8000 | 0.8000 |
| max{dn:dm} | 5.1936 | 7.1141 | 3.6344 | 5.8899 | 5.8230 |

In view of the above, examples 1 to 11 respectively satisfy the relationships shown in Tables 25-a and 25-b below. In Tables 25-a and 25-b, the units of F1, F2, F3, F4, F5, F6, F7, F56, TTL, H, F, D, R1, R2, R3, R4, R8, R9, R13, R14 are millimeter (mm), and the unit of FOV is degree (°). Tables 25-a and 25-b below shows a total track length TTL of the optical lens assembly, a total effective focal length F of the optical lens assembly, an image height H corresponding to the maximum field-of-view of the optical lens assembly, a maximum field-of-view FOV of the optical lens assembly, a maximum aperture D of the object-side surface of the first lens corresponding to the maximum field-of-view of the optical lens assembly, a radius of curvature R1 of the object-side surface of the first lens, a radius of curvature R2 of the image-side surface of the first lens, a radius of curvature R3 of the object-side surface of the second lens, a radius of curvature R4 of the image-side surface of the second lens, a radius of curvature R8 of the image-side surface of the fourth lens, a radius of curvature R9 of the object-side surface of the fifth lens, a radius of curvature R13 of the object-side surface of the seventh lens, a radius of curvature R14 of the image-side surface of the seventh lens, a focal length value F1 of the first lens, a focal length value F2 of the second lens, a focal length value F3 of the third lens, a focal length value F4 of the fourth lens, a focal length value F5 of the fifth lens, a focal length value F6 of the sixth lens, a focal length value F7 of the seventh lens, a combined focal length F56 of the fifth lens and the sixth lens, and a maximum value max{dn:dm} in ratios between axial center thicknesses of any two lenses among the first lens to seventh lens.

TABLE 25-a

| Conditional/Example | E1 | E2 | E3 | E4 | E5 | E6 |
|---|---|---|---|---|---|---|
| TTL | 45.2741 | 43.5995 | 44.456 | 45.1024 | 43.2844 | 44.7237 |
| F | 5.8243 | 5.8974 | 5.6495 | 5.8069 | 5.6676 | 5.8006 |
| H | 10.2000 | 10.3040 | 9.9540 | 10.2080 | 10.4800 | 10.1020 |
| FOV | 106.0000 | 106.0000 | 106.0000 | 106.0000 | 106.0000 | 106.0000 |
| D | 16.9006 | 15.8245 | 18.5502 | 16.8769 | 16.1220 | 18.7254 |
| R1 | 31.5337 | 26.7649 | 45.3056 | 31.5337 | 27.0674 | 45.3056 |
| R2 | 6.0469 | 5.8896 | 7.1466 | 6.0469 | 6.1112 | 7.1466 |
| R3 | −6.75187 | −6.50103 | −6.4883 | −6.75187 | −6.59024 | −6.4883 |
| R4 | −8.1062 | −7.1287 | −8.0322 | −8.1062 | −7.2336 | −8.0322 |
| R8 | 11.4849 | 10.6742 | 12.3068 | 11.4849 | 10.9385 | 12.3068 |
| R9 | 24.8345 | −51.0515 | −40.3547 | −51.0515 | −56.3304 | −40.3547 |
| R13 | 12.3153 | 19.3792 | 63.2651 | 12.3153 | 18.4464 | 63.2651 |
| R14 | 58.2051 | 57.46342 | 67.87996 | 58.20507 | 58.2176 | 67.87996 |
| F1 | −10.0282 | −10.2015 | −11.2412 | −10.0282 | −10.7021 | −11.2412 |
| F2 | 186.1071 | 64.1688 | 285.6624 | 186.1071 | 53.04061 | 285.6624 |
| F3 | 27.8670 | −120.5958 | 18.8047 | 27.3601 | −220.9626 | 18.8047 |
| F4 | 33.3681 | 15.3462 | 16.2481 | 33.3681 | 15.8588 | 16.2481 |
| F5 | 9.5070 | 8.6474 | −6.6965 | 9.5070 | 7.8354 | −6.6965 |
| F6 | −8.3909 | −8.6619 | 8.1119 | −8.3849 | −7.5640 | 8.3102 |
| F7 | 25.4474 | 47.4743 | 1116.1037 | 25.4474 | 43.8945 | 1116.1037 |
| F56 | 388.9815 | 68.7304 | −59.7836 | 417.8482 | 79.4374 | −50.4413 |
| R1/R2 | 0.1918 | 0.2201 | 0.1577 | 0.1918 | 0.2258 | 0.1577 |
| |R8/R9| | 0.4625 | 0.2091 | 0.3050 | 0.2250 | 0.1942 | 0.3050 |
| |R13/R14| | 0.2116 | 0.3372 | 0.9320 | 0.2116 | 0.3169 | 0.9320 |
| TTL/F | 7.7733 | 7.3930 | 7.8690 | 7.7671 | 7.6371 | 7.7102 |
| TTL/H/FOV | 0.0419 | 0.0399 | 0.0421 | 0.0417 | 0.0390 | 0.0418 |
| D/H/FOV | 0.0156 | 0.0145 | 0.0176 | 0.0156 | 0.0145 | 0.0175 |
| |F5/F6| | 1.1330 | 0.9983 | 0.8255 | 1.1338 | 1.0359 | 0.8058 |
| max{dn:dm} | 3.2463 | 3.8462 | 4.3080 | 3.4627 | 4.5291 | 4.3080 |
| |R3/R4| | 0.8329 | 0.9120 | 0.8078 | 0.8329 | 0.9111 | 0.8078 |
| |F56/F| | 66.7860 | 11.6543 | 10.5821 | 71.9576 | 14.0160 | 8.6959 |
| (FOV * F)/H | 60.5270 | 60.6684 | 60.1617 | 60.2986 | 57.3252 | 60.8651 |
| |(R3 − R4)/(R3 + R4)| | 0.0912 | 0.0461 | 0.1063 | 0.0912 | 0.0465 | 0.1063 |
| F/H | 0.5710 | 0.5723 | 0.5676 | 0.5689 | 0.5408 | 0.5742 |
| |F/R1| | 0.1847 | 0.2203 | 0.1247 | 0.1841 | 0.2094 | 0.1280 |
| |F1/F| | 1.7218 | 1.7298 | 1.9898 | 1.7270 | 1.8883 | 1.9379 |
| |F2/F| | 31.9536 | 10.8808 | 50.5640 | 32.0495 | 9.3585 | 49.2474 |
| |F3/F| | 4.7846 | 20.4489 | 3.3285 | 4.7117 | 38.9868 | 3.2419 |
| |F4/F| | 5.7291 | 2.6022 | 2.8760 | 5.7463 | 2.7981 | 2.8011 |
| |F5/F| | 1.6323 | 1.4663 | 1.1853 | 1.6372 | 1.3825 | 1.1545 |
| |F6/F| | 1.4407 | 1.4688 | 1.4359 | 1.4440 | 1.3346 | 1.4327 |
| |F7/F| | 4.3692 | 8.0500 | 197.5573 | 4.3823 | 7.7448 | 192.4131 |

TABLE 25-b

| Conditional/Example | E7 | E8 | E9 | E10 | E11 |
|---|---|---|---|---|---|
| TTL | 26.9021 | 24.6323 | 24.0043 | 24.9634 | 25.1716 |
| F | 5.0981 | 4.0724 | 4.0183 | 4.1806 | 4.1479 |
| H | 8.1080 | 8.2460 | 8.1840 | 7.7400 | 8.0900 |
| FOV | 120.0000 | 120.0000 | 120.0000 | 120.0000 | 120.0000 |
| D | 9.1172 | 11.2838 | 10.645 | 9.5604 | 9.8338 |
| R1 | 6.0248 | 6.2589 | 4.3796 | 6.2314 | 5.7105 |
| R2 | 2.5462 | 2.2448 | 1.8553 | 2.1698 | 2.0328 |
| R3 | −7.4814 | −7.8234 | −6.9178 | −8.2607 | −8.0506 |
| R4 | −10.4972 | −15.2814 | −9.6411 | −10.6790 | −10.6144 |
| R8 | −25.2263 | −17.7443 | 120.0000 | −22.0886 | −23.9561 |
| R9 | −17.7910 | 36.4457 | 6.8901 | −37.6453 | −78.3253 |
| R13 | 16.2224 | 5.6389 | 5.3848 | 41.6484 | −89.0000 |
| R14 | 25.8664 | 7.09425 | 8.0591 | −99.0000 | −15.3547 |
| F1 | −8.2758 | −6.6750 | −6.6264 | −6.3390 | −6.0890 |
| F2 | −107.8392 | −33.3874 | −77.8378 | −386.9900 | −230.9469 |
| F3 | 9.4106 | 6.6602 | 6.7992 | 7.6527 | 7.35904 |
| F4 | 95.1872 | −20.1382 | −12.4350 | −92.3937 | −58.8494 |
| F5 | 7.0467 | 5.6147 | 4.8958 | 6.0941 | 6.0566 |
| F6 | −7.7052 | −7.4564 | −7.0784 | −7.2802 | −6.6895 |
| F7 | 67.3985 | 29.8426 | 22.8918 | 50.0214 | 31.0880 |
| F56 | 46.3982 | 16.7806 | 12.6889 | 29.1398 | 37.3954 |
| R1/R2 | 0.4227 | 0.3587 | 0.4236 | 0.3482 | 0.3560 |
| |R8/R9| | 1.4179 | 0.4869 | 17.4162 | 0.5868 | 0.3059 |
| |R13/R14| | 0.6272 | 0.7948 | 0.6682 | 0.4207 | 5.7963 |
| TTL/F | 5.2769 | 6.0486 | 5.9738 | 5.9712 | 6.0685 |
| TTL/H/FOV | 0.0277 | 0.0249 | 0.0244 | 0.0269 | 0.0259 |
| D/H/FOV | 0.0094 | 0.0114 | 0.0108 | 0.0103 | 0.0101 |
| |F5/F6| | 0.9145 | 0.7530 | 0.6917 | 0.8371 | 0.9054 |
| max{dn:dm} | 5.1936 | 7.1141 | 3.6344 | 5.8899 | 5.8230 |
| |R3/R4| | 0.7127 | 0.5120 | 0.7175 | 0.7735 | 0.7585 |
| |F56/F| | 9.1011 | 4.1205 | 3.1578 | 6.9702 | 9.0155 |
| (FOV*F)/H | 75.4529 | 59.2638 | 58.9191 | 64.8155 | 61.5263 |
| |(R3 − R4)/(R3 + R4)| | 0.1677 | 0.3228 | 0.1645 | 0.1277 | 0.1374 |
| F/H | 0.6288 | 0.5023 | 0.4956 | 0.5156 | 0.5116 |
| |F/R1| | 0.8462 | 0.6507 | 0.9175 | 0.6709 | 0.7264 |
| |F1/F| | 1.623316 | 1.63907 | 1.649057 | 1.516289 | 1.467983 |
| |F2/F| | 21.1528 | 8.1984 | 19.3709 | 92.5681 | 55.6780 |
| |F3/F| | 1.8459 | 1.6354 | 1.6921 | 1.8305 | 1.7742 |
| |F4/F| | 18.6711 | 4.9450 | 3.0946 | 22.1006 | 14.1878 |
| |F5/F| | 1.3822 | 1.3787 | 1.2184 | 1.4577 | 1.4602 |
| |F6/F| | 1.5114 | 1.8309 | 1.7615 | 1.7414 | 1.6127 |
| |F7/F| | 13.2203 | 7.3280 | 5.6969 | 11.9651 | 7.4948 |

The present disclosure further provides an electronic device that may include an optical lens assembly according to the above-described embodiments of the present disclosure and an imaging element for converting an optical image formed by the optical lens assembly into an electrical signal. The electronic device may be a stand-alone electronic device such as a range detection camera, or an imaging module integrated on a device such as a range detection device. In addition, the electronic device may alternatively be a stand-alone imaging device such as an on-board camera, or an imaging module integrated in, for example, a driving assistance system.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens, a fifth lens, a sixth lens and a seventh lens, which are arranged sequentially from an object side to an image side along an optical axis, wherein,
   the first lens has a negative refractive power, and an object-side surface of the first lens is a convex surface, and an image-side surface of the first lens is a concave surface;
   the second lens has a refractive power, an object-side surface of the second lens is a concave surface, and an image-side surface of the second lens is a convex surface;
   the third lens has a refractive power;
   the fourth lens has a refractive power;
   the fifth lens has a refractive power, wherein an object-surface of the fifth lens is a convex surface, and an image-surface of the sixth lens is a convex surface or a concave surface;
   the sixth lens has a refractive power, wherein the refractive power of the sixth lens is opposite to the refractive power of the fifth lens; and
   the seventh lens has a positive refractive power,
   wherein 50≤(FOV×F)/H≤75.4529, wherein FOV is a maximum field-of-view of the optical lens assembly, H is an image height corresponding to the maximum field-of-view of the optical lens assembly, and F is a total effective focal length of the optical lens assembly, wherein the optical lens assembly comprises no more than seven lenses.

2. The optical lens assembly according to claim 1, wherein the fifth lens and the sixth lens are cemented to form a cemented lens.

3. The optical lens assembly according to claim 1, wherein an image-side surface of the sixth lens is a convex surface.

4. The optical lens assembly according to claim 1, wherein the third lens has a positive refractive power, and an object-side surface or an image-side surface of the third lens a convex surface.

5. The optical lens assembly according to claim 1, wherein the third lens has a negative refractive power or a positive refractive power; or the fourth lens has a negative refractive power or a positive refractive power.

6. The optical lens assembly according to claim 1, wherein TTL/H/FOV≤0.06,
wherein TTL is an axial distance from the object-side surface of the first lens to the imaging plane of the optical lens assembly,
FOV is a maximum field-of-view of the optical lens assembly, and
H is an image height corresponding to the maximum field-of-view of the optical lens assembly.

7. The optical lens assembly according to claim 1, wherein D/H/FOV≤0.025,
wherein FOV is a maximum field-of-view of the optical lens assembly,
H is an image height corresponding to the maximum field-of-view of the optical lens assembly, and
D is a maximum aperture of the object-side surface of the first lens corresponding to the maximum field-of-view of the optical lens assembly.

8. The optical lens assembly according to claim 1, wherein TTL/F≤9 or 5.2769≤TTL/F≤8,
wherein TTL is an axial distance from the object-side surface of the first lens to the imaging plane of the optical lens assembly, and
F is a total effective focal length of the optical lens assembly.

9. The optical lens assembly according to claim 1, wherein 1≤p≤8, wherein p=dn(max)/dn(min), where dn(max) is an axial center thickness having a maximum value among the first lens to seventh lens, and dm (min) is an axial center thickness having a minimum value among the first lens to seventh lens.

10. The optical lens assembly according to claim 1, wherein R1/R2≤30 or 2.3606≤R1/R2≤6.3395,
wherein R1 is a radius of curvature of the object-side surface of the first lens, and
R2 is a radius of curvature of the image-side surface of the first lens.

11. The optical lens assembly according to claim 1, wherein |R13/R14|≤15 or 0.2116≤|R13/R14|≤5.7963,
wherein R13 is a radius of curvature of the object-side surface of the seventh lens and
R14 is a radius of curvature of the image-side surface of the seventh lens.

12. The optical lens assembly according to claim 1, wherein |R3/R4|≤15 or 0.512≤|R3/R4|≤0.912,
wherein R3 is a radius of curvature of the object-side surface of the second lens, and
R4 is a radius of curvature of the image-side surface of the second lens.

13. The optical lens assembly according to claim 1, wherein 0.1≤|F5/F6|≤1.6,
wherein F5 is a focal length of the fifth lens, and
F6 is a focal length of the sixth lens.

14. The optical lens assembly according to claim 1, wherein 3≤|F56/F|,
wherein F56 is a combined focal length of the fifth lens and the sixth lens, and
F is a total focal length of the optical lens assembly.

15. The optical lens assembly according to claim 1, wherein 0.02≤|(R3−R4)/(R3+R4)|≤0.4 or 0.0461≤|(R3−R4)/(R3+R4)|≤0.4,
wherein R3 is a radius of curvature of the object-side surface of the second lens, and
R4 is a radius of curvature of the image-side surface of the second lens.

16. The optical lens assembly according to claim 1, wherein F/H≤3,
wherein F is a total focal length of the optical lens assembly, and
H is an image height corresponding to a maximum field-of-view of the optical lens assembly.

17. The optical lens assembly according to claim 1, wherein |F/R1|≤1.5 or 0.1247≤|F/R1|≤1.5,
wherein F is a total effective focal length of the optical lens assembly, and
R1 is a radius of curvature of the object-side surface of the first lens.

18. An imaging device, comprising an optical lens assembly and an imaging element for converting an optical image formed by the optical lens assembly into an electrical signal, the optical lens assembly comprising: a first lens, a second lens, a third lens, a fourth lens, a fifth lens, a sixth lens and a seventh lens, which are arranged sequentially from an object side to an image side along an optical axis,
wherein,
the first lens has a negative refractive power, and an object-side surface of the first lens is a convex surface, and an image-side surface of the first lens is a concave surface;
the second lens has a refractive power, an object-side surface of the second lens is a concave surface, and an image-side surface of the second lens is a convex surface;
the third lens has a refractive power;
the fourth lens has a refractive power;
the fifth lens has a refractive power, wherein an object-surface of the fifth lens is a convex surface, and an image-surface of the sixth lens is a convex surface or a concave surface;
the sixth lens has a refractive power, wherein the refractive power of the sixth lens is opposite to the refractive power of the fifth lens; and
the seventh lens has a positive refractive power,
wherein 50≤(FOV×F)/H≤75.4529, wherein FOV is a maximum field-of-view of the optical lens assembly, H is an image height corresponding to the maximum field-of-view of the optical lens assembly, and F is a total effective focal length of the optical lens assembly,
wherein the optical lens assembly comprises no more than seven lenses.

19. The optical lens assembly according to claim 1, wherein at least one of 1.467983≤|F1/F|≤1.9898, 0.05≤|F5/F|≤1.6372, 1.6354≤|F3/F| or |F6/F|≤1.8309 is satisfied,
wherein F is a total focal length of the optical lens assembly, F3 is a focal length of the third lens, F5 is a focal length of the fifth lens, and F6 is a focal length of the six lens.

20. The optical lens assembly according to claim 1, wherein the fifth lens has a positive refractive power, and the sixth lens has a negative refractive power.

* * * * *